(12) United States Patent
Coffaro et al.

(10) Patent No.: US 10,992,974 B2
(45) Date of Patent: Apr. 27, 2021

(54) SYSTEM AND METHOD FOR VIDEO AUTOMATION

(71) Applicant: Fox Broadcasting Company, Los Angeles, CA (US)

(72) Inventors: Joseph Coffaro, Thousand Oaks, CA (US); Jason Beard, Castaic, CA (US); Matthew McKay, Portland, OR (US)

(73) Assignee: FOX BROADCASTING COMPANY, LLC, Los Angeles, CA (US)

( * ) Notice: Subject to any disclaimer, the term of this patent is extended or adjusted under 35 U.S.C. 154(b) by 262 days.

(21) Appl. No.: 15/504,716

(22) PCT Filed: Aug. 18, 2015

(86) PCT No.: PCT/US2015/045654
§ 371 (c)(1),
(2) Date: Feb. 17, 2017

(87) PCT Pub. No.: WO2016/028754
PCT Pub. Date: Feb. 25, 2016

(65) Prior Publication Data
US 2017/0244995 A1 Aug. 24, 2017

Related U.S. Application Data

(60) Provisional application No. 62/038,562, filed on Aug. 18, 2014.

(51) Int. Cl.
*H04N 21/266* (2011.01)
*H04N 5/222* (2006.01)
*H04N 5/265* (2006.01)
*H04H 60/04* (2008.01)
*H04N 21/2665* (2011.01)
(Continued)

(52) U.S. Cl.
CPC .......... *H04N 21/266* (2013.01); *H04H 60/04* (2013.01); *H04N 5/2224* (2013.01); *H04N 5/265* (2013.01); *H04N 5/268* (2013.01); *H04N 21/232* (2013.01); *H04N 21/2665* (2013.01); *H04N 21/6125* (2013.01)

(58) Field of Classification Search
None
See application file for complete search history.

(56) References Cited

U.S. PATENT DOCUMENTS 5,307,456 A * 4/1994 MacKay ............... G06F 3/0481
                                              348/E5.022
5,537,157 A * 7/1996 Washino .................. G06F 3/14
                                              348/445

(Continued)

OTHER PUBLICATIONS

International Application No. PCT/US2015/045654 International Search Report and Written Opinion, dated Jan. 25, 2016, 11 pages.

(Continued)

Primary Examiner — Justin E Shepard
(74) Attorney, Agent, or Firm — Cantor Colburn LLP

(57) ABSTRACT

Plural content items are managed via a central user interface, configured to allow selection and modification of plural content items. The interface may include alternate channel and property icons, allowing one control to display and modify what used to take plural rooms and stations to broadcast content.

34 Claims, 33 Drawing Sheets

(51) Int. Cl.
*H04N 5/268* (2006.01)
*H04N 21/232* (2011.01)
*H04N 21/61* (2011.01)

(56) References Cited

U.S. PATENT DOCUMENTS

| | | | |
|---|---|---|---|
| 8,539,526 B1 | 9/2013 | Hundemer | |
| 8,825,507 B1* | 9/2014 | Ginda | G06Q 10/1095 |
| | | | 379/265.05 |
| 2005/0066366 A1* | 3/2005 | Takamine | H04N 5/44591 |
| | | | 725/59 |
| 2005/0187806 A1 | 8/2005 | Wurtzel et al. | |
| 2007/0203737 A1* | 8/2007 | Boozer | G06Q 10/10 |
| | | | 705/310 |
| 2008/0250445 A1* | 10/2008 | Zigmond | G06Q 30/02 |
| | | | 725/32 |
| 2009/0187826 A1 | 7/2009 | Heimbold et al. | |
| 2009/0290070 A1 | 11/2009 | Duke et al. | |
| 2011/0125846 A1* | 5/2011 | Ham | H04L 12/1859 |
| | | | 709/204 |
| 2011/0225417 A1* | 9/2011 | Maharajh | G06F 21/10 |
| | | | 713/150 |
| 2012/0166958 A1* | 6/2012 | Cramer | G06F 11/324 |
| | | | 715/736 |
| 2013/0254308 A1 | 9/2013 | Rose et al. | |
| 2014/0025787 A1 | 1/2014 | Nguyen et al. | |
| 2014/0047481 A1 | 2/2014 | Proehl et al. | |
| 2014/0075474 A1 | 3/2014 | Moreau et al. | |
| 2014/0189148 A1 | 7/2014 | Correa et al. | |

OTHER PUBLICATIONS

EP Application No. 15834374 Search Report and Written Opinion dated Mar. 12, 2018, 9 pages.
Grass Valley: "GV Edge Integrated Playout System", Dec. 4, 2013, XP055334622, Retrieved from the Internet: URL:https://web.archive.org/web/20131204014817/http://www.grassvalley.com/docs/DataSheets/ips/gv_edge/SDP-5090D-4_Edge_Solution.pdf [retrieved on Jan. 12, 2017], 16 pages.
Primestream Corporation: "Control it all (TM)—Broadcast Automation and Media Asset Management", Jan. 19, 2012, pp. 1-20, XP055455800, Retrieved from the Internet: URL:www.gencom.com/LiteratureRetrieve.aspx?ID=111113 [retrieved on Mar. 1, 2018].
EP Application No. 15834374.9 Office Action dated Nov. 8, 2019, 6 pages.

* cited by examiner

Preset Management

Store Preset — 174
Lock Preset from Overwriting — 176
Label Production — 178
172

180

Request button Flashing

Step 1 – Create the Effect in Adobe Flash

Example of Flash screen where keyframes are edited to create effects

*Harmonic GFX directory holds DVE instructions and Graphics necessary to Re-create the desired effects.*

Description of the Harmonic GFX EFX

|    | swf NAME (Shockwave Flash Object) | PGM TYPE | Effect |
|----|-----------------------------------|----------|--------|
| 2  |                                   |          |        |
| 3  | S001D_D2B_3P_3                    | Studio Show |       |
| 4  | S001D_D2B_3P_2                    | Studio Show |       |
| 5  | S001D_D2B_3P_1                    | Studio Show |       |
| 6  | S001D_D_STATIC_1                  | Studio Show | Comm Hold Center 2-line squeeze |
| 7  | S001D_D_STATIC                    | Studio Show | Comm. Hold Center 2-line squeeze |
| 8  | S001D_B2D_3P_4                    | Studio Show | End Commercial return to TWING |
| 9  | S001D_B2D_3P_3                    | Studio Show | End Commercial return to TWING |
| 10 | S001D_B2D_3P_2                    | Studio Show | End Commercial return to TWING |
| 11 | S001D_B2D_3P_1                    | Studio Show | TWING to Center for Commercial |
| 12 | S001D_B2D_1                       | Studio Show | TWING to Center for Commercial |
| 13 | S001C_B2C_3P_1                    | Studio Show | L-Billboards |
| 14 | S001B_B2A_1                       | Studio Show | TWING OUT |
| 15 | S001B_B_STATIC_1                  | Studio Show | TWING HOLD |
| 16 | S001B_A2B_1                       | Studio Show | TWING IN |

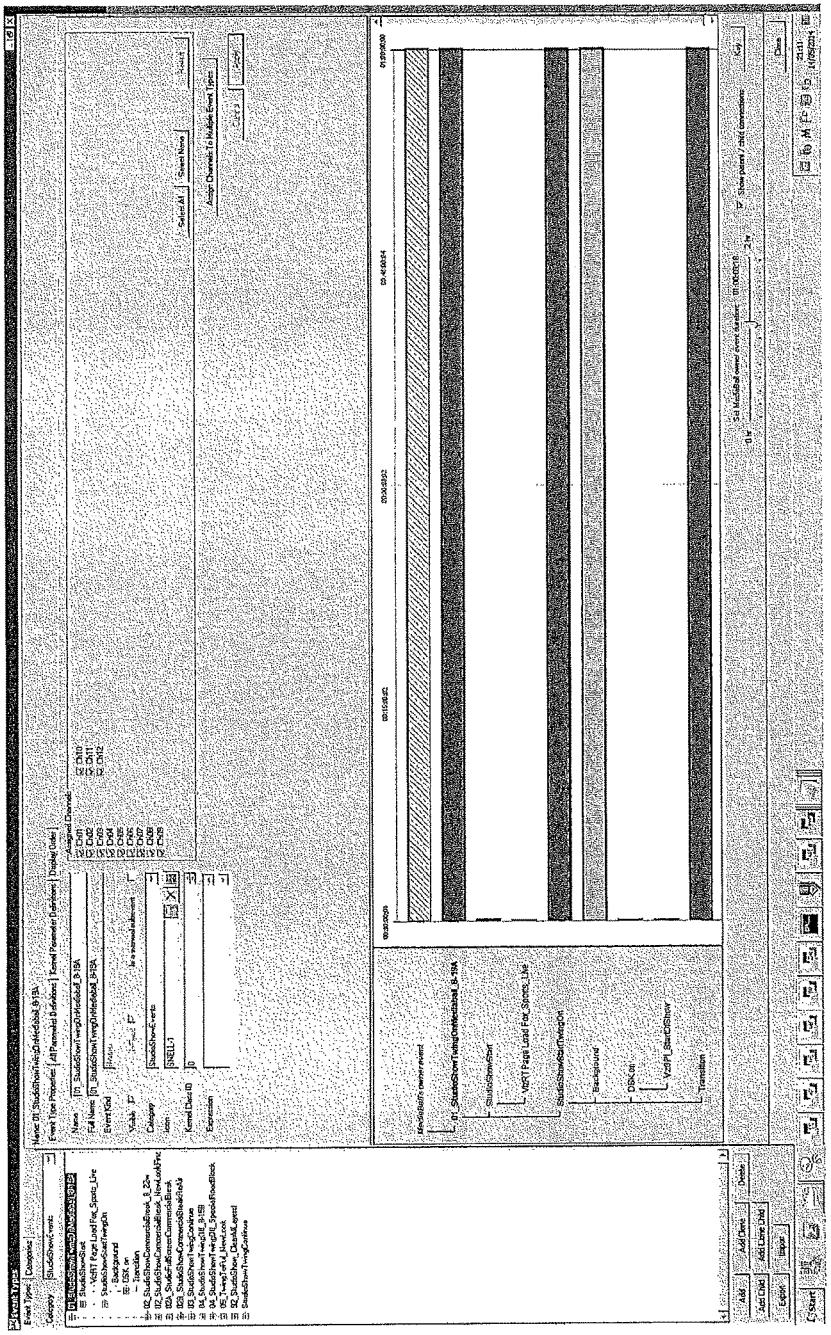
Step 3 – Use the .SWF and GFX to create Snell MediaBall EFX
*Snell Mediaball creates the subset of instructions sent to Harmonic to Re-create the desired effects.*
*NOTE: AS THE EFFECTS ARE CREATED, THEY ARE AVAILABLE TO ALL OF FOX*
FIGURE 3D

Description of the Harmonic GFX EFX & Corresponding Snell MediaBalls

MEDIA BALLS

Studio Show Mediaballs

| MEDIABALL | DESCRIPTION | HARMONIC ID |
|---|---|---|
| 01_StudioShowTwingOnMediaBall_8_15D | Show Open :03 squeeze to a Twing | S001B_A2B_1.swf   HSC_FS1_TWINGV3.jpg |
| 02_StudioShowCommercialBreak_8_15 | Video Center for Commercial | S001D_B2D_3P_2.swf |
| 03_StudioShowTwingContinue | ProgramVideo moves left & Wing comes on for TW1 S001B_B_STATIC.swf |  |
| 04_StudioShowTwingOff_8-15B | Show End Wing Off Ticker stays | S001B_B2A_1.swf |
| 90_StudioShow_IQ_DSK_On | Brings Viz TWING on | |
| 91_StudioShow_IQ_DSK_off | Takes Viz TWING off | |
| 92_StudioShow_ClearAllLayers | Clears all Effects | |

FIGURE 31

Step 4 – Add the Appropriate Snell MediaBall EFX
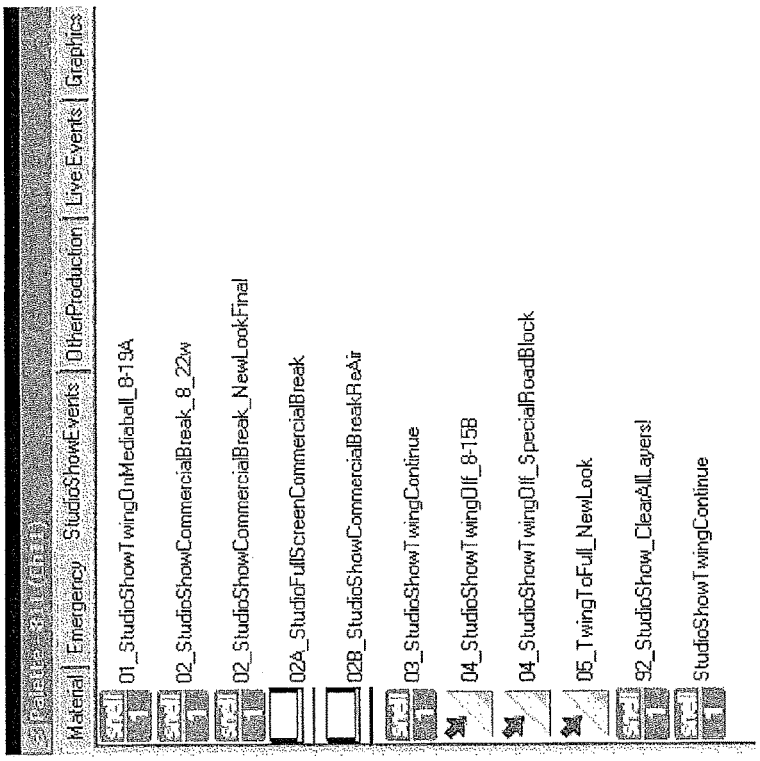
*Snell Mediaballs are translated from traffic to automation using the Snell translator and/or can be manually selected to be added to the list.*
FIGURE 30

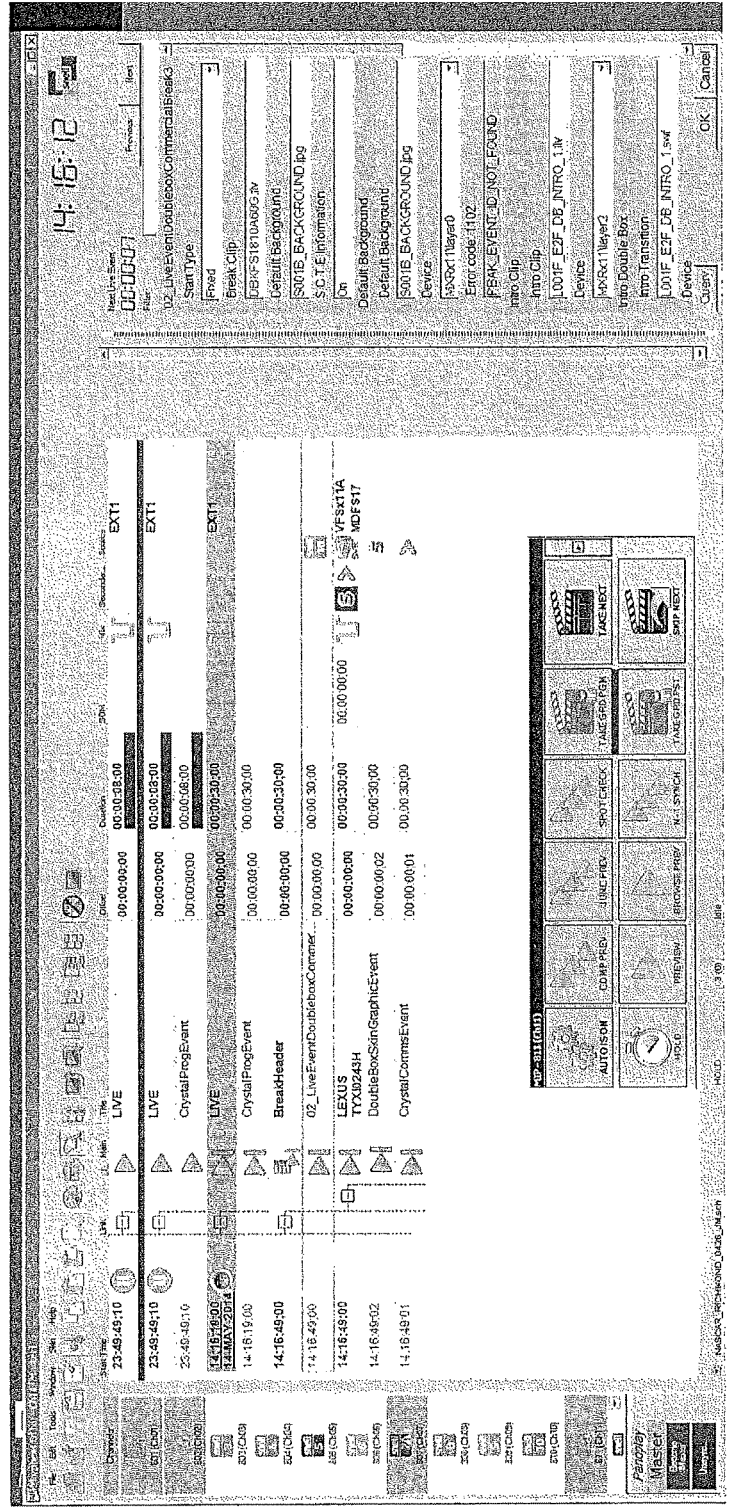
FIGURE 33
*Nested Snell Mediaball "instructions" can be expanded to show the steps.*

Step 5 – Run the effect
238
*The Snell Mediaball "instructions" including showing the selected graphical elements can be edited on the right side of the screen if necessary.*
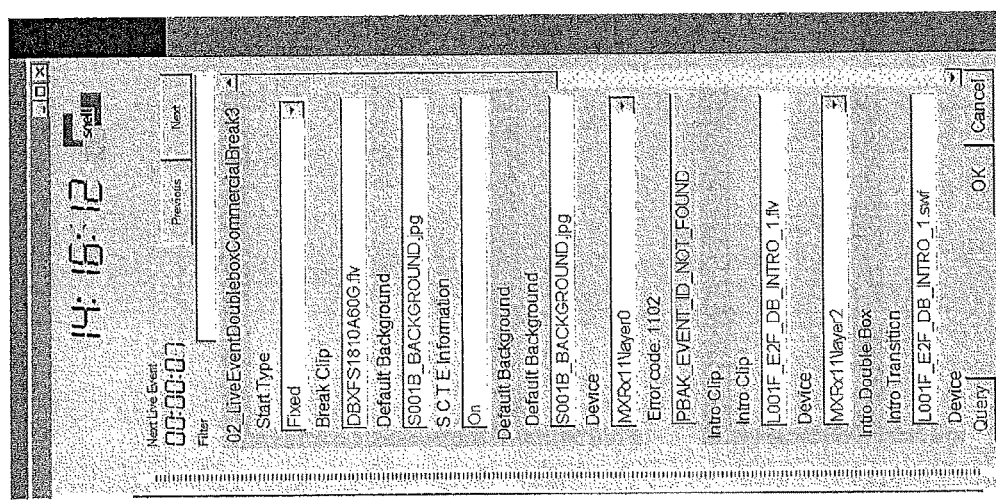
FIGURE 34

TWING Editorial Staff updates information into templates. Graphics are automatically generated using VIZ Content Pilot templates. This allows graphic artists to spend time on Creativity.

*This is a Style Guide Example enabling us to create the instructions.*

SYSTEM AND METHOD FOR VIDEO AUTOMATION

BACKGROUND

The present disclosure relates to a system and method for display of content managed by a central control that is at least partially automated.

In contemporary content display systems, and in particular, broadcast content display systems, individual programs are separately controlled and managed for display across one or more network systems. In one example, 16 dedicated control rooms were fixed to Quality Control (QC) work function and physical channel paths. Other MCR work tasks such as Ingest, VOD and BSNP were located in non-ideal locations and environments within the limited space of the MCR environment.

What is needed in the art are improved methods alleviating redundancy and inefficiencies related to managing plural content shows or streams across at least one network.

SUMMARY

The above described problems and disadvantages in the art are overcome or alleviated by the present system and method for managing plural content shows or streams across at least one network.

In exemplary embodiments, plural content items are managed via a central user interface, configured to allow selection and modification of plural content items. The interface may include alternate channel and property icons, allowing one control to display and modify what used to take plural rooms and stations to broadcast content.

The above also translates to improved advertising methods, including control and integration of advertising campaigns across different content streams or networks.

Further, additional data elements, e.g., statistics, multiple box displays and angles or other related or non-related (i.e., different streams or content) may be managed by the control, allowing for complete customization from a central location. Further, such a system may allow for automatic data integration depending upon content selection (e.g., updated scores).

The above discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the following FIGURES:

FIG. 29 illustrates an exemplary page illustrating Harmonic GFX EFX descriptions;

FIG. 30 illustrates an exemplary page for creation of effects in Adobe Flash;

FIG. 31 illustrates an exemplary page for MediaBall descriptions;

FIG. 32 illustrates an exemplary page for adding MediaBall EFX;

FIG. 33 illustrates an exemplary page for running effects;

FIG. 34 illustrates another exemplary page for running effects;

FIG. 40 illustrates an exemplary production screen incorporating Master Control flow Twing effects;

FIG. 42 illustrates an exemplary production screen incorporating Master Control flow Double Box effects;

DETAILED DESCRIPTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

In exemplary embodiments, plural content items are managed via a central user interface, configured to allow selection and modification of plural content items. The interface may include alternate channel and property icons, allowing one control to display and modify what used to take plural rooms and stations to broadcast content.

Embodiments of the present invention revise prior workflow practices from the traditional MCR environment into a more flexible and 'virtual' environment. The concept of 'virtualisation' allows maximizing of the use of new and existing resources and also bring in a further level of hardware redundancy not available before. In exemplary embodiments any of the plural MCR control rooms (e.g., the 16 described above) may take on any task and any channel at any time. The key to allowing this possibility is in a layer of control logic that provides an abstraction of the different core hardware elements from the control requirements from an operational perspective. Doing so brings together a unified control interface combining the key parameters of each separate device into a single workflow based around, e.g., touchscreen operational panels.

In exemplary embodiments, such central user interface includes a master control switcher (MCR) providing improved signal flow. Exemplary core system components include a Snell Morpheus Automation system, a 1152×1152 Evertz EQX router for a main MCR environment and associated processing gear. Exemplary control interfaces and logic are provided by a VSM system to support workload.

Figure 1:
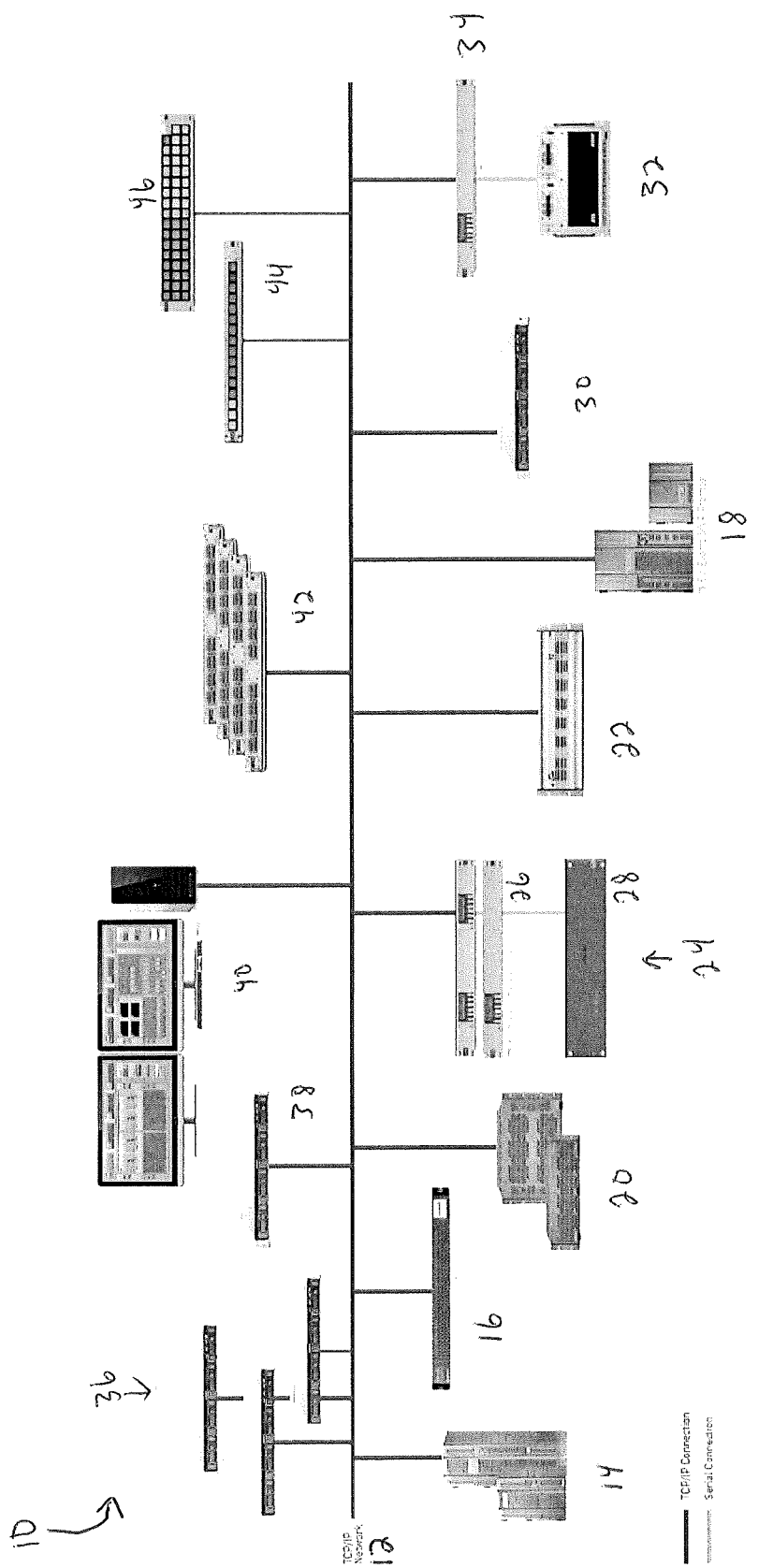
FIG. 1 illustrates an exemplary schematic overview of an exemplary VSM system.

FIG. 1 illustrates an exemplary overview of a VSM system, shown generally at 10. Connected to an exemplary TCP/IP Network 12 are: a 1152×1152 Evertz EQX router 14; a 48× Harmonic Channel Port (Oxtel Protocol over IP) 16; 5× Evertz MVP Multiviewere system (Image Video Protocol over IP) 18; 41× Evertz Modular Frames (SNMP via IP) 20; 5× Snell Modular Frames (Snell Rollcall Protocol over IP) 22; 1× Snell Morpheus Automation (Probel SWP-08 over Serial) 24, with 1× Single SmartHub and 2× Dual SmartHubs 26 connected to 3× TSL Tallyman Controllers (Tallyman UMD Protocol 3.1) 28 over Serial; redundant Snell Morpheus Automation 30; 1× RTS Adam Intercom System 32 (Command Line Protocol over Serial with 1× Single Smarthub 34); 3 Server VSM Cluster (vsmStudio) 36; a vSNMP Monitoring Server 38; 30× vsmPanel Client License 40; 6× GPVO boxes 42; 37× LBP16e 44 and 2× LBP50e 46 VSM control panels.

Figure 2:
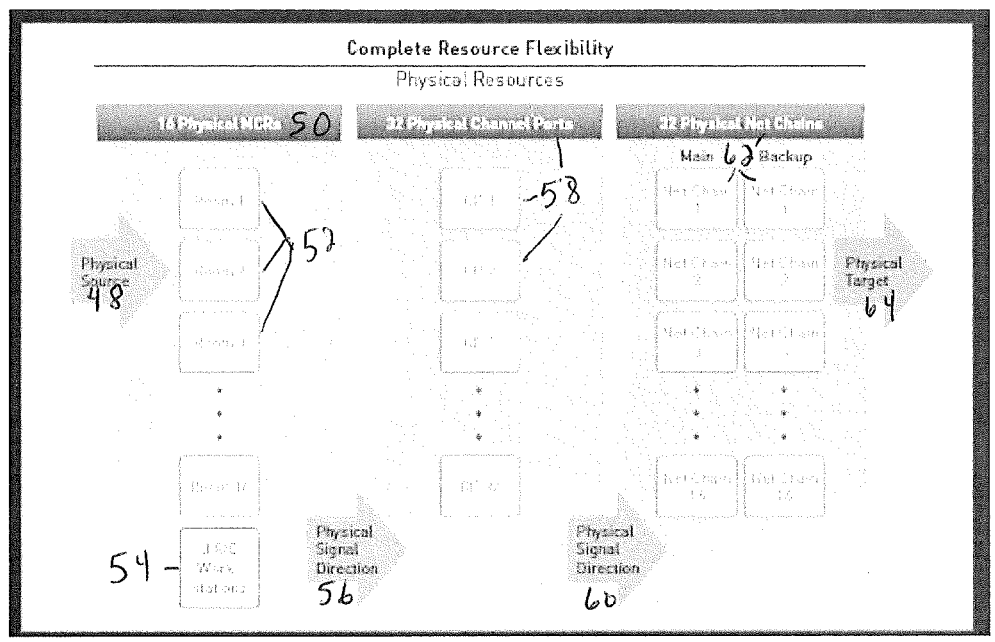
FIG. 2 illustrates an exemplary schematic overview of physical resources of an exemplary VSM system.
Figure 3:
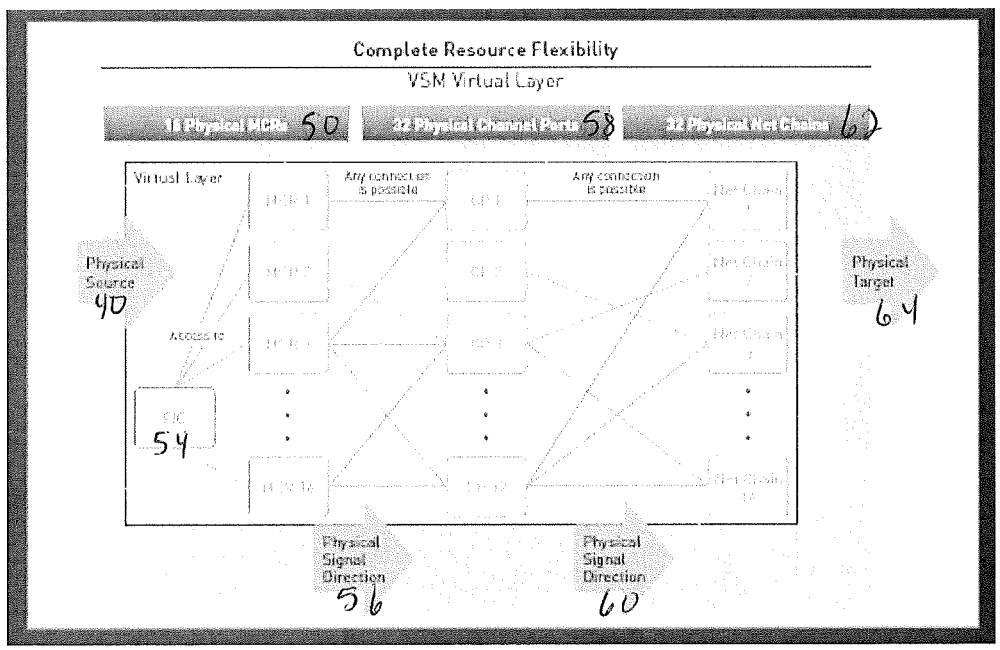
FIG. 3 illustrates an exemplary schematic overview of a VSM virtual layer of an exemplary VSM system.

FIGS. 2 and 3 illustrate exemplary physical resources and VSM Virtual Layer, respectively for VSM as the fundamental control layer. In exemplary embodiments, VSM provides the control interfaces and logic to give the maximum flexibility of each environment. This is achieved by allowing any channel or operation to be recalled to any MCR control room with either a manual button push or a pre-scheduled recall. This includes signal routing, tally requirements, modular gear control and settings, monitor wall setups and intercom panel layouts. In essence, the control rooms are 'shells' containing hardware elements to which productions or Master Control signal chains can be recalled.

In exemplary embodiments, numerous simplified user GUIs were designed to create an operational workflow which is focussed to the exact nature of the work currently recalled to a particular room. In addition, there is a level of administration possible by the MCR managers (EICs) on custom VSM panels allowing both offline setup of productions as well the recall of productions to rooms either manually or by a pre-programmed schedule.

In essence, in exemplary embodiments, live events and MCR tasks can be pre-planned and rooms automatically recalled to the correct channel settings and function based on a time base. Included in the workflow logic is an improved overview from the central administration of the current function of a particular room by use of customised overview GUIs. The boxing logic of VSM allows this 'dynamic' moving and recalling of resources and their current settings to other studios within the MCR environment for handling emergency cases or last minute decisions.

In exemplary embodiments, VSM handles all Tally requirements in the new MCRs with the possibility to also provide feedback and Tally information into the Live Production Control Rooms at various portions of the facility to indicate actual on-air status.

Referring back to FIG. 2 and the example of 16 physical MCRs, an exemplary physical source 48 includes 16 Physical MCRs 50 provided in 16 rooms 52 and three workstations 54. The physical signal direction listed at 56 moves to 32 Physical Channel Ports 58, illustrated as "CP1", "CP2", etc. The physical signal direction 60 moves to 32 Physical Net Chains (16 main and 16 backup) 62, listed as "Net Chain 1", "Net Chain 2", etc., for main and backup chains, and moving further to a physical target 64.

Referring to FIG. 3, the 16 Physical MCRs 50, 32 Physical Channel Ports 58 and 32 Physical Net Chains 62 are illustrated in a VSM Virtual Layer showing various possible connections.

Figure 4:
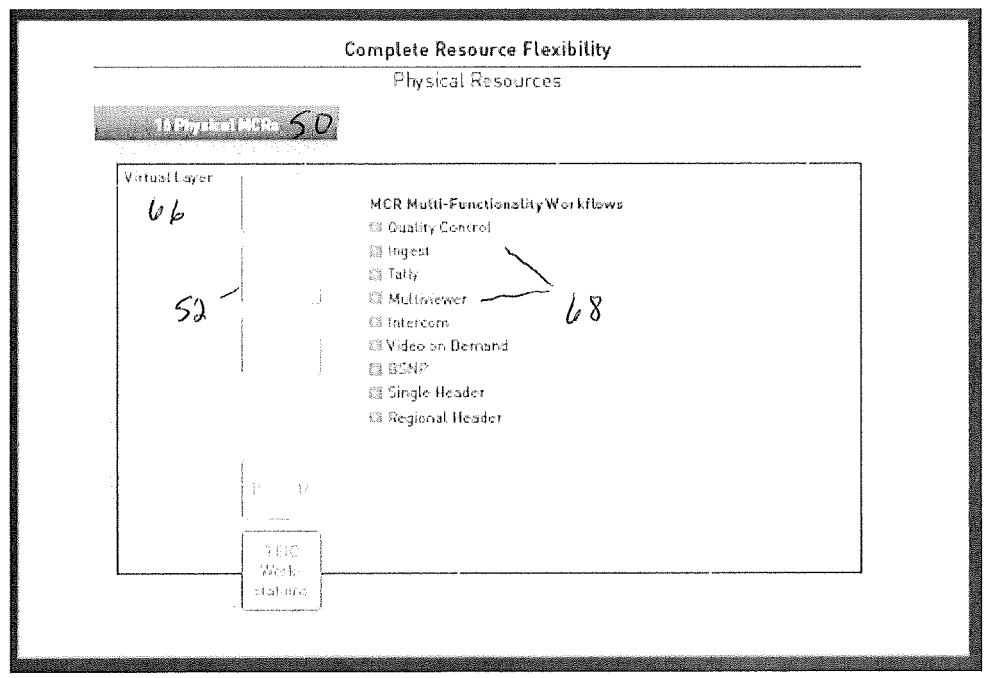
FIG. 4 illustrates an exemplary schematic overview of MCR Multi-functionality Workflows.
Figure 5:
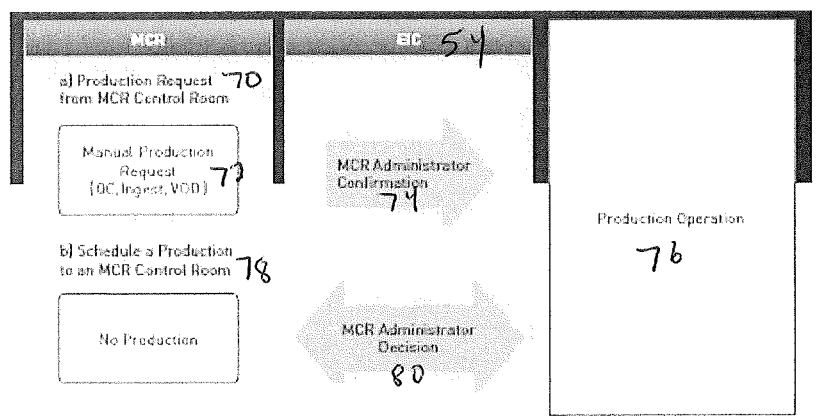
FIG. 5 illustrates an exemplary schematic overview of production requests and Administrator action.

Referring now to FIGS. 4 and 5, an exemplary MCR workflow concept is described. One of the key benefits of installing an exemplary VSM system was the possibility to change the work flow thinking from physical resource needs to production requirements. Operations are no longer restricted to channels or productions being tied to particular studios or hardware resources. Productions can now be prepared offline in a virtual way and then recalled to any free control room either by a manual action or via a pre-scheduled recall. The manual recall of a production can be triggered either by an MCR operator from within the control room in conjunction with approval from the MCR administrator or by the MCR administrator directly from the central administrators position. FIG. 5 illustrates an exemplary MCR flow, with a production request 70 from the MCR Control Room (e.g., a Manual Production Request 72 (QC, Ingest, VOD, etc.)) with MCR Administrator Confirmation 74 in the EIC 54 prior to a Production Operation 76 and scheduling of a production to an MCR Control Room 78 with an MCR Administrator Decision 80 in EIC 54.

In exemplary embodiments, the request and approval workflow is handled through custom configured logic that also takes into account any on-air Tally status so that no On-Air studio can be changed at any time to another production accidently. Additionally, based on the production type that is requested (such as 'Quality Control' or 'Ingest' for instance), an operationally optimized panel layout based on that workflow is presented to the operator. This is only possible due to the dynamic and freely configurable nature of VSM panels. FIG. 4 illustrates relative to the virtual layer 66, various exemplary MCR Multi-Functionality Workflows 68, including: Quality Control, Ingest, Tally, Multiviewer, Intercom, Video on Demand, BSNP, Single Header and Regional Header.

A key task of an exemplary VSM system is providing a tactile and simplified GUI to control parameters of the Harmonic Channel Port device and Snell Down Stream Keyers so that manual override capabilities are possible when programmed mistakes or failures occur from the Snell Automation. In addition, VSM integrates with the Snell Morpheus Automation system so that there can be more centralised recall of the resources if needed from the main playout automation. VSM is the only control system (no Evertz control system installed) for the main Evertz EQX MCR router as well as providing customized interfaces and logic for Evertz Glue. Further functionality offered by VSM includes multiviewer routing and layout recall of the Evertz VIP system in every MCR control room and also allowing operator panel layout changes and recall of the RTS intercom system. In all, VSM creates a simplified control layer for all elements of the MCR production environment allowing complete control rooms to be recalled to optimized setups either manually with a single button push, or automatically with an internal scheduler.

Figure 7:
FIG. 7 illustrates an exemplary MCR administration and status panel.
Figure 8:
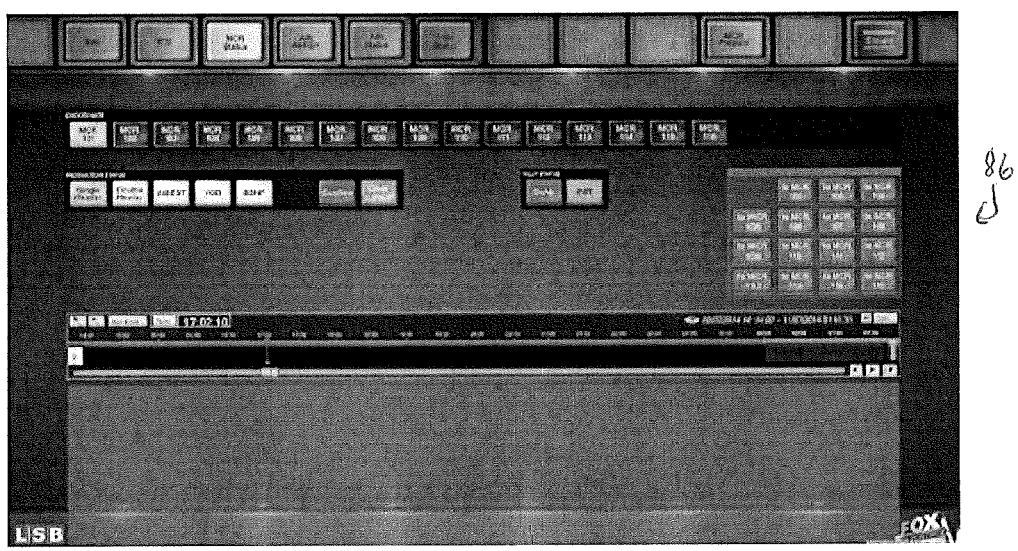
FIG. 8 illustrates an exemplary MCR administration and setup panel.

With reference to FIGS. 7-8, an exemplary basis of the MCR control workflow is focused around 3 main software touchscreen operated panels. MCR Panel—a panel that lives in each of the 16 MCR control rooms. MCR Status and MCR Administration and Setup Panels—panels that work together at the main MCR administrator's work position (EIC panels).

Figure 6:
FIG. 6 illustrates an exemplary MCR panel.

Each exemplary panel has multipage functionality with an individual operational workflow dedicated to the appropriate task. Basic tasks such as signal routing, multiviewer setup and Intercom panel assignment functions are available on all panels. FIG. 6 illustrates an exemplary MCR panel at 82. FIG. 7 illustrates an MCR administration and status panel at 84. FIG. 8 illustrates an MCR administration and setup panel at 86.

Figure 9:
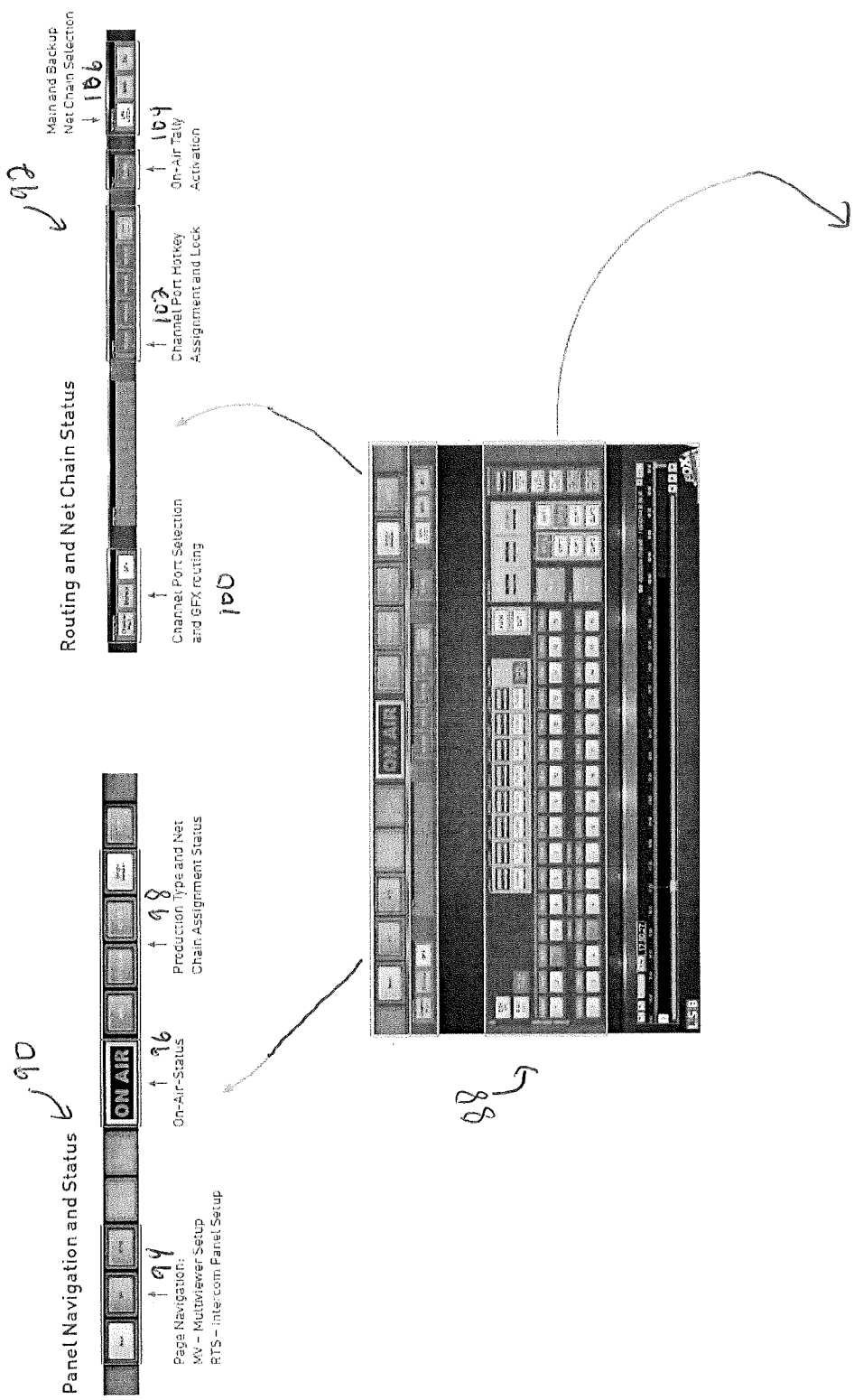
FIG. 9 illustrates an exemplary MCR panel with expanded portions for panel navigation and status and routing and net chain status.
Figure 10:
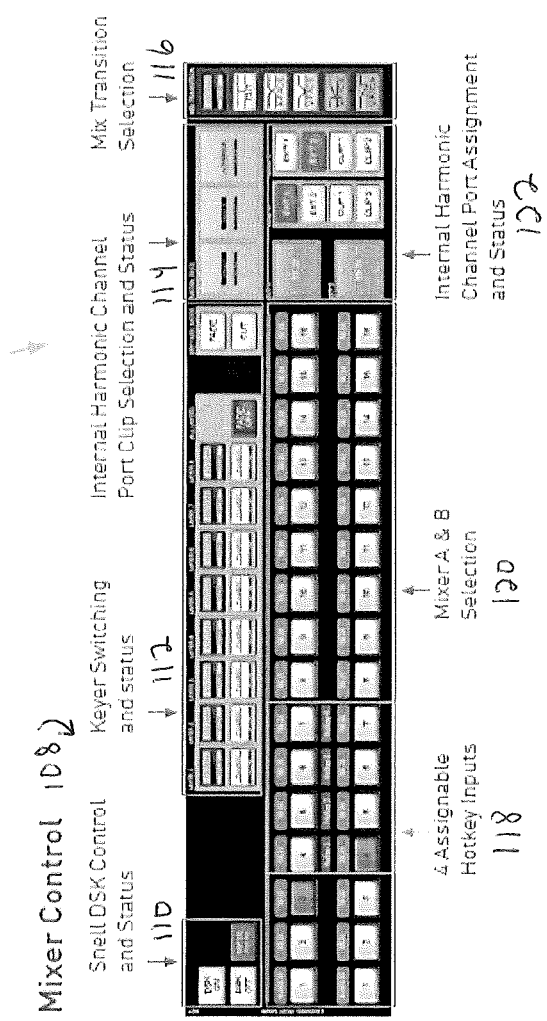
FIG. 10 illustrates an exemplary mixer control portion from the exemplary MCR panel of FIG. 9.

FIGS. 9 and 10 illustrate more detail of an exemplary Quality Control MCR Panel at 88, with close-ups of panel navigation and status portions at 90 and routing and net chain status at 92. The illustrated exemplary portion at 90 includes page navigation, Multiviewer setup and intercom panel setup controls at 94, on air status at 96 and production type and net chain assignment status at 98. The illustrated exemplary portion at 92 includes channel port selection and GFX routing controls at 100, channel port hotkey assignment and lock at 102, on air tally activation at 104 and main and backup net chain selection at 106.

FIG. 10 illustrates a closeup of the exemplary mixer control portion 108 from FIG. 9, including: Snell DSK control and status 110; keyer switching and status 112; internal harmonic channel port clip selection and status 114; mix transition selection 116; assignable hotkey inputs (in this case 4) 118; mixer A and B selection 120; and internal harmonic channel port assignment and status 122.

The primary task of the exemplary MCR panels is to support the Quality Control job function. The main interface for the MCR operators is a single 24 inch touch screen which gives an optimized layout of live control functions and an overview of signal path, Tally and system status.

The primary function of the exemplary panel 'QC' workflow is to provide manual control of the functions of the Harmonic Channel Port device so that programmed errors in the Snell automation (which is typically the main controller of the device) can be overridden in the fastest time possible—in essence the panel simulates the Master Control Switcher interface. VSM connects to each of the 32 Harmonic Channel portsvia IP and utilizes the Oxtel protocol to provide control over the following exemplary parameters: Mixer Source selection with mix transition style; Keyer control—switching of all 8 keyers independently or all together with a selection mode of the key fade; Selecting the input source of each mixer between External or Internal Sources; Internal File query and selection for keyers; Stop/Start/Restart/Set start point etc. of internal Animations; and Tally status and changes.

In further exemplary embodiments, 2 Channel Port devices are assigned to each 'channel' for main and backup 'Net chain' paths; and VSM synchronizes up to 12 devices at the same time in regard to both routing possibilities and the current status.

Figure 11:
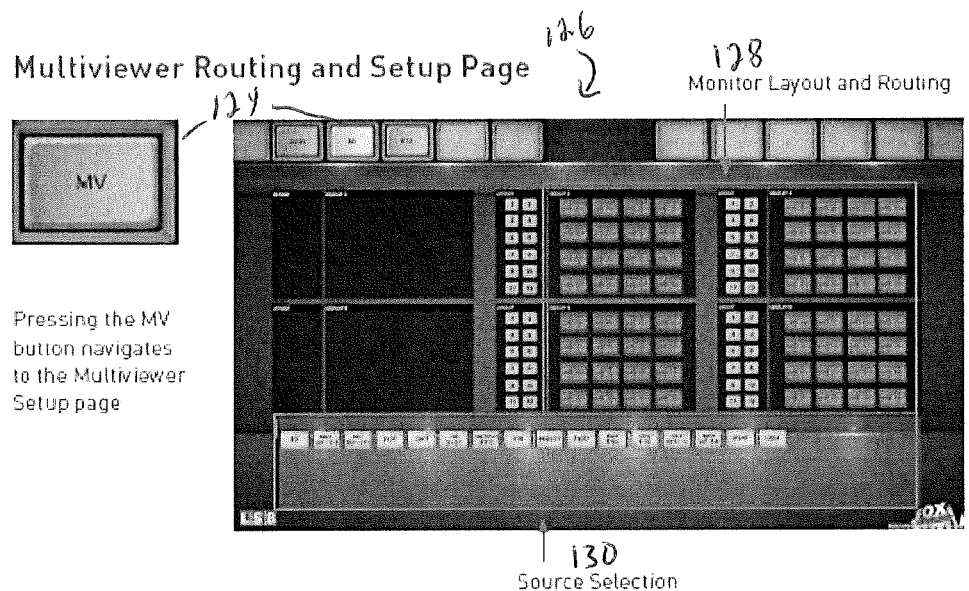
FIG. 11 illustrates an exemplary multiviewer routing and setup page.
Figure 12:
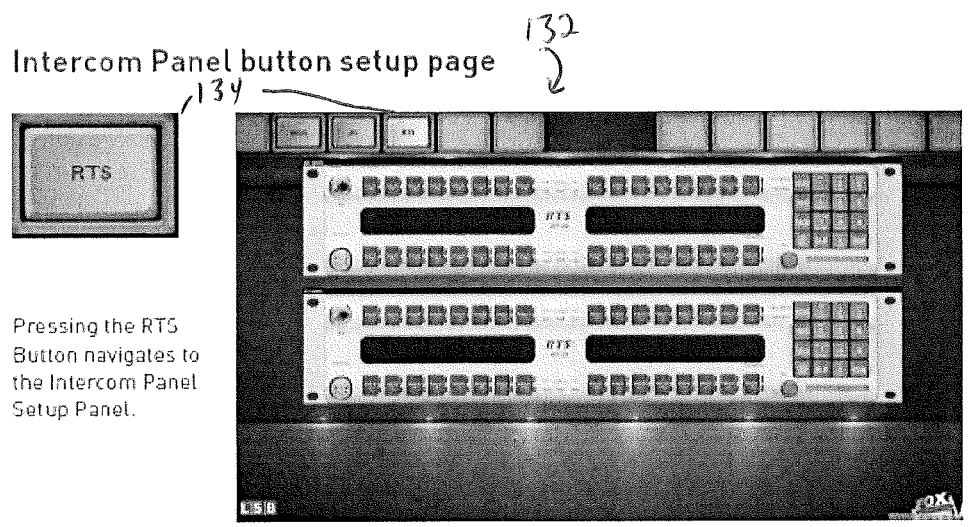
FIG. 12 illustrates an exemplary intercom panel button setup page.

FIG. 11 illustrates an exemplary Multiviewer Routing and Setup interface 126 activated by pressing the MV button 124. The interface 126 also includes monitor layout and routing controls 128 and source selection controls 130. FIG. 11 illustrates an exemplary Intercom Panel button setup page 132 activated by pressing the RTS button 134.

Figure 13:
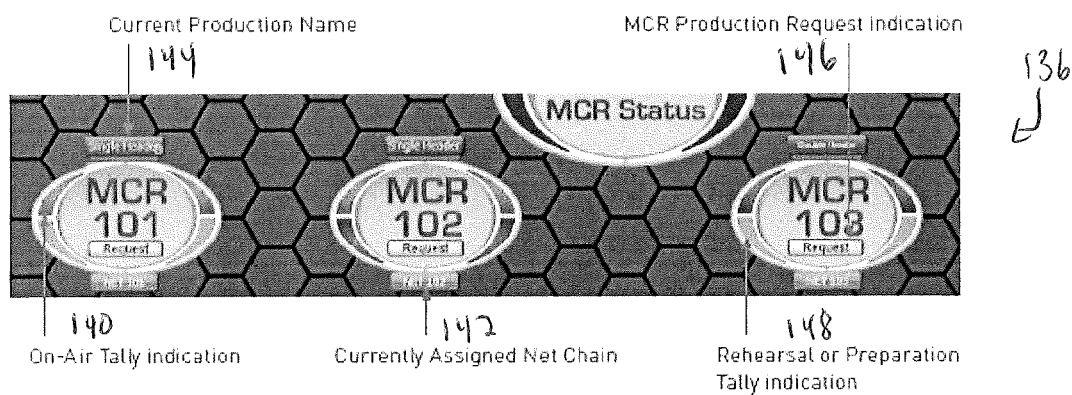
FIG. 13 illustrates an exemplary MCR status panel.
Figure 15:
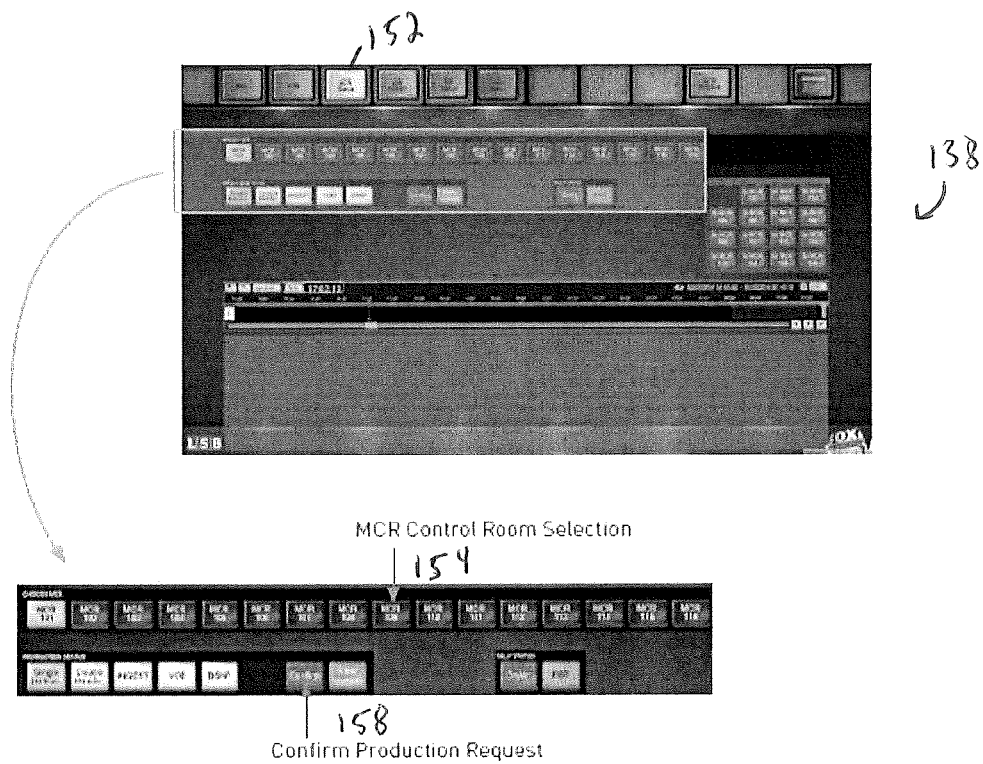
FIG. 15 illustrates an exemplary MCR administration and setup panel with expanded control room selection and production request confirmation portion.

With regard to MCR Administrator panels, e.g., 136 at FIGS. 13 and 138 at FIG. 15, in exemplary embodiment, such panels sit side by side, with interaction between them (e.g., each being displayed and controlled from 24 inch touchscreen monitors. The exemplary MCR status panel 136 provides an overview of the current status of each of the 16 control rooms (continuing with the example with 16 rooms). This includes, e.g., on air status 140, current net chain assignment 142 and the current production in the room 144. In addition, if an MCR operator is manually requesting to make a production, this may also be indicated by a flashing 'Request' button 146. If this area is then touched, it automatically navigates the MCR administration panel to the MCR setup page in question. A rehearsal or preparation tally indication is also illustrated at 148.

Figure 14:
FIG. 14 illustrates an exemplary routing page.

An exemplary routing page is illustrated in FIG. 14 at 150, with the main page of the panel providing complete Router Control via an XY operation concept. In general, an exemplary MCR Administration and Setup panel provides the functions to prepare productions offline, schedule productions to MCR control rooms, confirm MCR Control Room requests to manually recall productions, Net chain to MCR Control Room assignments, and handling switching of a current production from one MCR Control room to another in an emergency.

FIG. 15 illustrates an exemplary MCR Status and Assignment Page 138 (activated by pushing the MCR status button 152). A close-up of the relevant page portion 154 shows controls for MCR Control Room Selection 156 and controls for confirming production requests 158.

Figure 16:
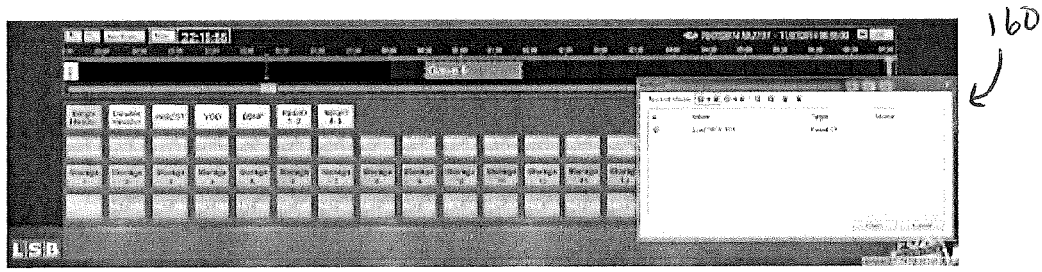
FIG. 16 illustrates an exemplary MCR scheduling panel.

FIG. 16 illustrates a workflow example, e.g., for scheduling a production to an MCR Control Room at 160. Utilizing the internal scheduler of VSM, a pre-prepared and stored production can be scheduled to be automatically loaded into an MCR Control Room. There is some safety that if an MCR Control Room has On-Air Tally, then the recall is not activated.

Figure 17:
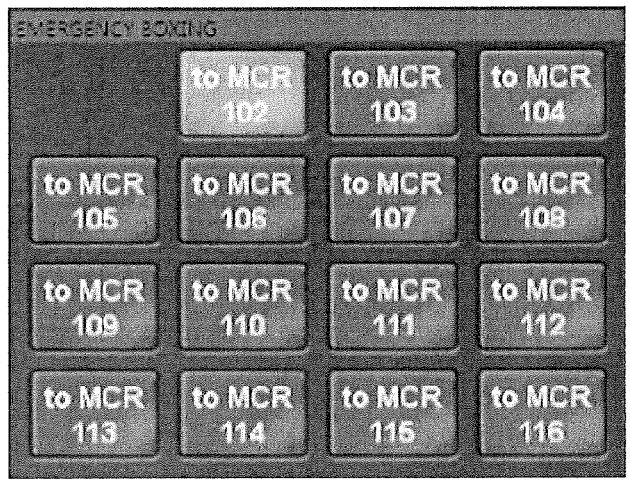
FIG. 17 illustrates an exemplary MCR emergency switching panel.

FIG. 17 illustrates exemplary emergency switching of a production from one MCR Control Room to another at 162. Utilising the 'Boxing' functionality of VSM, a complete production with real time settings (routing, net chain assignments, MV Setup, Intercom Panel Assignments, etc.) can be switched from one MCR Control Room to another in an emergency. Again this is not allowed to an MCR Control Room that is currently on-air.

Figure 18:
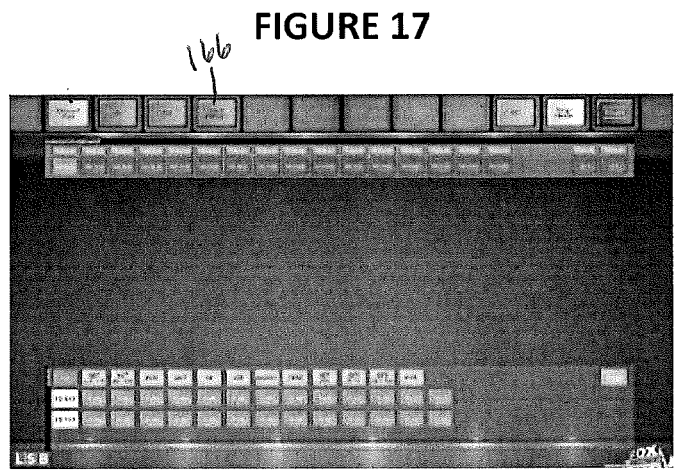
FIG. 18 illustrates an exemplary offline production preparation and storage interface.

FIG. 18 illustrates exemplary offline production preparation and storage at 164. Pressing the 'MCR Prepare' Button 166 navigates to the page for preparing offline virtual productions. This includes Harmonic Channel Port input assignments, Multiviewer setup, and Intercom Panel Setups which are stored and recalled together as a complete production setting.

Figure 19:
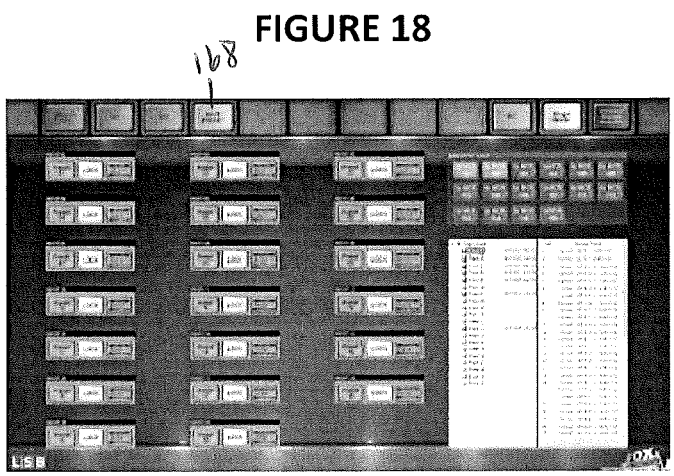
FIG. 19 illustrates an exemplary save preset page.
Figures 20, 21:
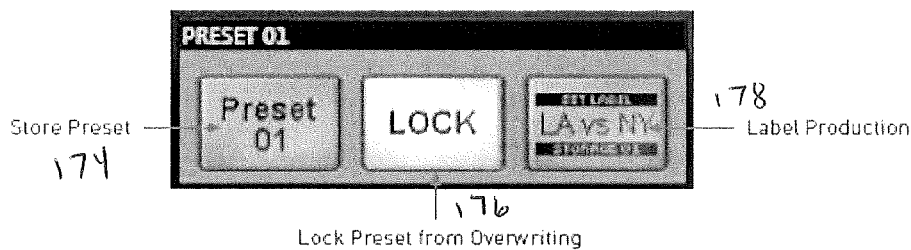
FIG. 20 illustrates exemplary preset management controls.
FIG. 21 illustrates an exemplary preset overview page.

FIG. 19 illustrates an exemplary save preset function (see button 168) on exemplary screen interface 170. Once the production settings are defined, the 'save preset' button navigates to the preset administration page. FIG. 20 illustrates an exemplary preset management interface 172, with buttons for store preset 174, lock preset from overwriting 176 and label production 178.

Figure 22:
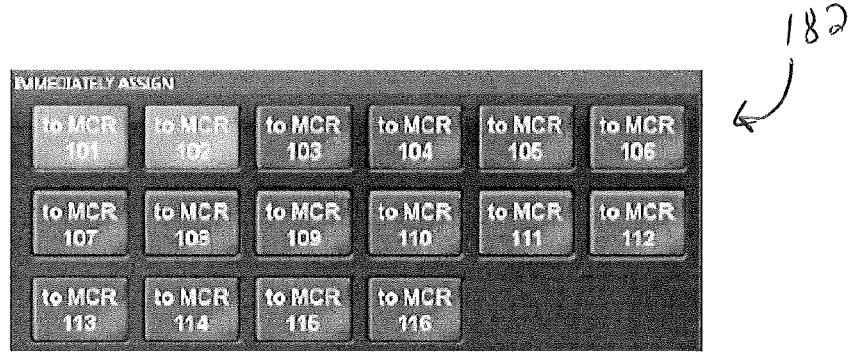
FIG. 22 illustrates an exemplary MCR control room immediate assign panel.

With reference to the exemplary preset overview interface at 180 in FIG. 21, the interface provides an overview of when the preset was last stored and a list of the stored settings of the preset. FIG. 22 illustrates an exemplary panel for immediate assignment of a preset to an MCR control panel at 182. In exemplary embodiments, this function is disabled when the MCR Control Room is on-air.

Figure 23:
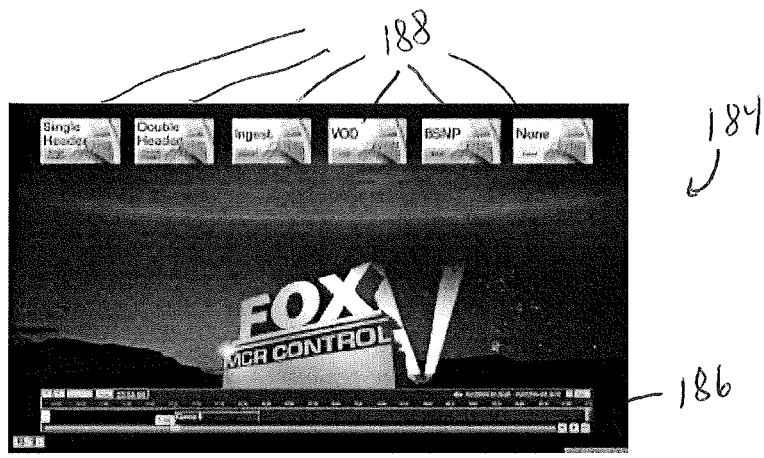
FIG. 23 illustrates an exemplary MCR Control Room panel.

The present exemplary control system provides a level of administration that allows an MCR operator to request a production type manually for the MCR Control Room directly. In exemplary embodiments, this needs confirmation from the MCR Administrator before the production settings are recalled to the Control Room in question. In exemplary embodiments, when a production is not allocated to an MCR Control Room, the room sits in a default state with the MCR Control Room Panel looking is shown at 184 in FIG. 23.

Along the bottom of the exemplary screen is a schedule bar 186 that shows the usage of the room in the upcoming hours so the operator has an overview as to how long the room is free before a scheduled production will utilize the room. Using the Production Selection buttons 188 along the top of the screen, the operator may now request one of the production types that they wish to recall. Once selected, the production is not instantly recalled to the room, but the selection button flashes indicating that the request has been sent to the MCR Administrator.

Figure 24:
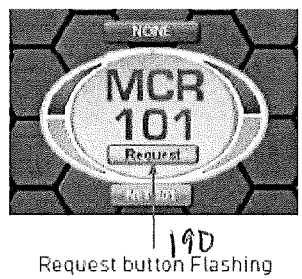
FIG. 24 illustrates an exemplary MCR status panel portion.
Figure 25:
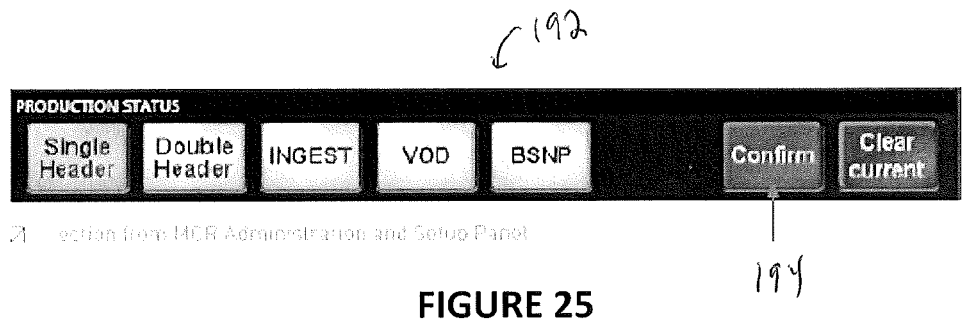
FIG. 25 illustrates an exemplary MCR production status page.

In conjunction with this action, the exemplary MCR Status panel (see 190 in FIG. 24) at the MCR Administrator's position will indicate the request by the flashing request button 19. FIG. 25 illustrates an exemplary MCR Administration and Setup Panel at 192, with a confirmation (relative to the production request) button 194. In exemplary embodiments, by pushing this button, the MCR Administrator navigates the MCR Administration panel to the appropriate MCR Status page allowing confirmation or denial. Upon confirmation, the MCR Control Panel will dynamically change to show the appropriate GUI for the production that has been recalled to the Control Room at that time.

In exemplary embodiments, the presently provided system provides a unique operational workflow that combines the control and recall of multiple devices into simplified and optimized operational software panels.

The presently described exemplary MCR workflow has been changed from a hardware resource managed environment to a production orientated workflow. In exemplary embodiments, MCR Control rooms can be freely assigned to any pre-prepared production settings either by simple manual actions or automatically via scheduled events. Many logical safety mechanisms are included in the workflow to avoid on-air errors. In addition, VSMs 'boxing' functionality allows the real time and dynamic moving of productions to any other control room in case of emergency.

In exemplary embodiments, VSM acts as the main router control system for the environment as well as handling all Tally requirements. In addition, a primary role of VSM is to provide the Master Control manual override interface for the Harmonic Channel Port 'channel in a box' solution so that any errors in automation can be quickly and simply rectified. All in all, the presently described exemplary MCR solution is an example of how VSM can maximize hardware and physical room resources by 'virtualizing' the environments so that physical signal path chains or production settings are no longer dedicated to physical hardware.

Figure 26:
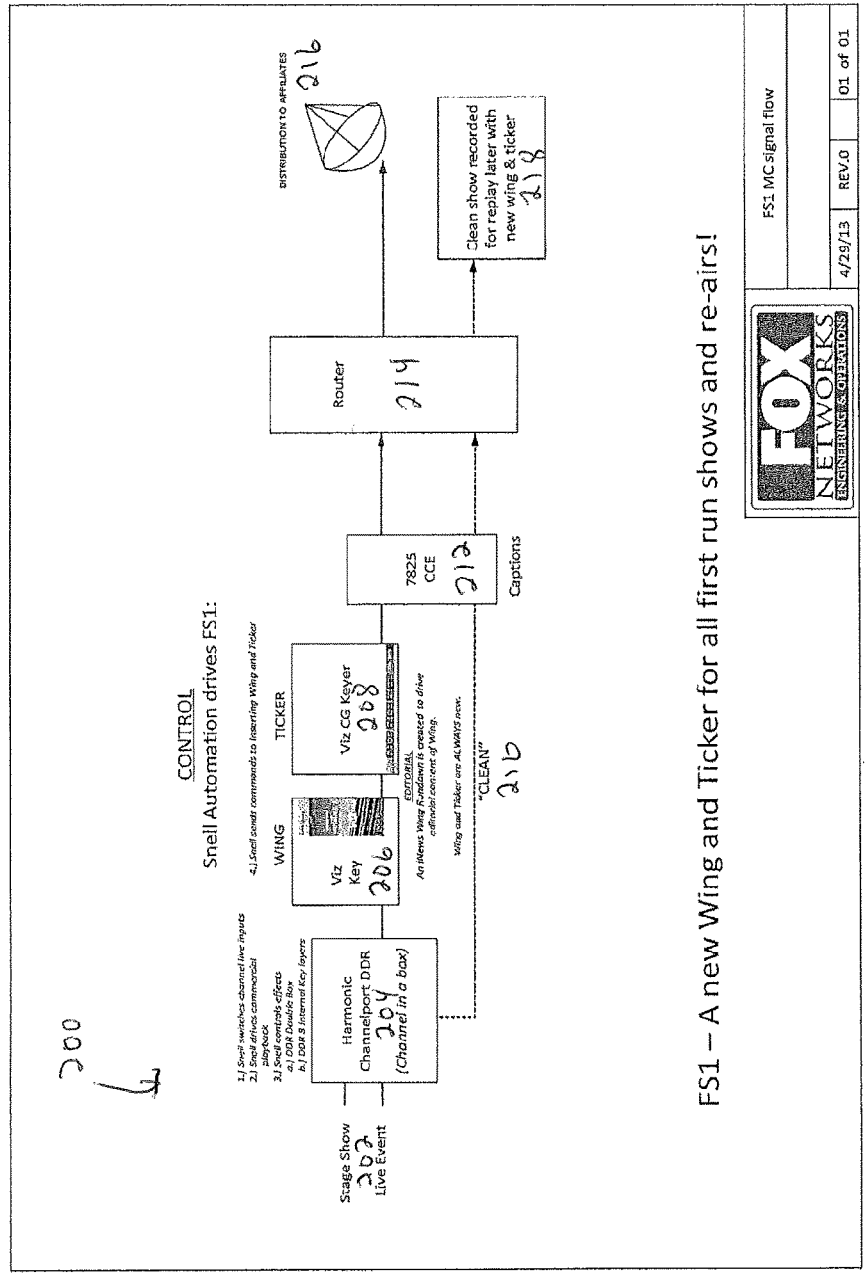
FIG. 26 illustrates an exemplary flowchart for master control of animation.

The present disclosure also provides for creation of effects for a master control via automation. Reference is made to FIG. 26, which illustrates an exemplary flow chart 200 for master control flow for creation of effects relative to a stage show or live event 202. In exemplary embodiments Snell automation is used to switch channel live inputs, drive commercial playback, control effects (e.g., DDR Double Box or DDR S internal key layers) and send commands to inserting wing and ticker. A Harmonic Channelport DDR (Channel in a box) 204 interacts with Wing (Viz Key) 206 and Ticker (Vix CG Keyer) 208 as well as providing a clean 210 signal to Captions 212. Router 214 passes distribution to affiliates 216 and/or records a clean show 218 for replay later with a new wing and ticker.

Figure 27:
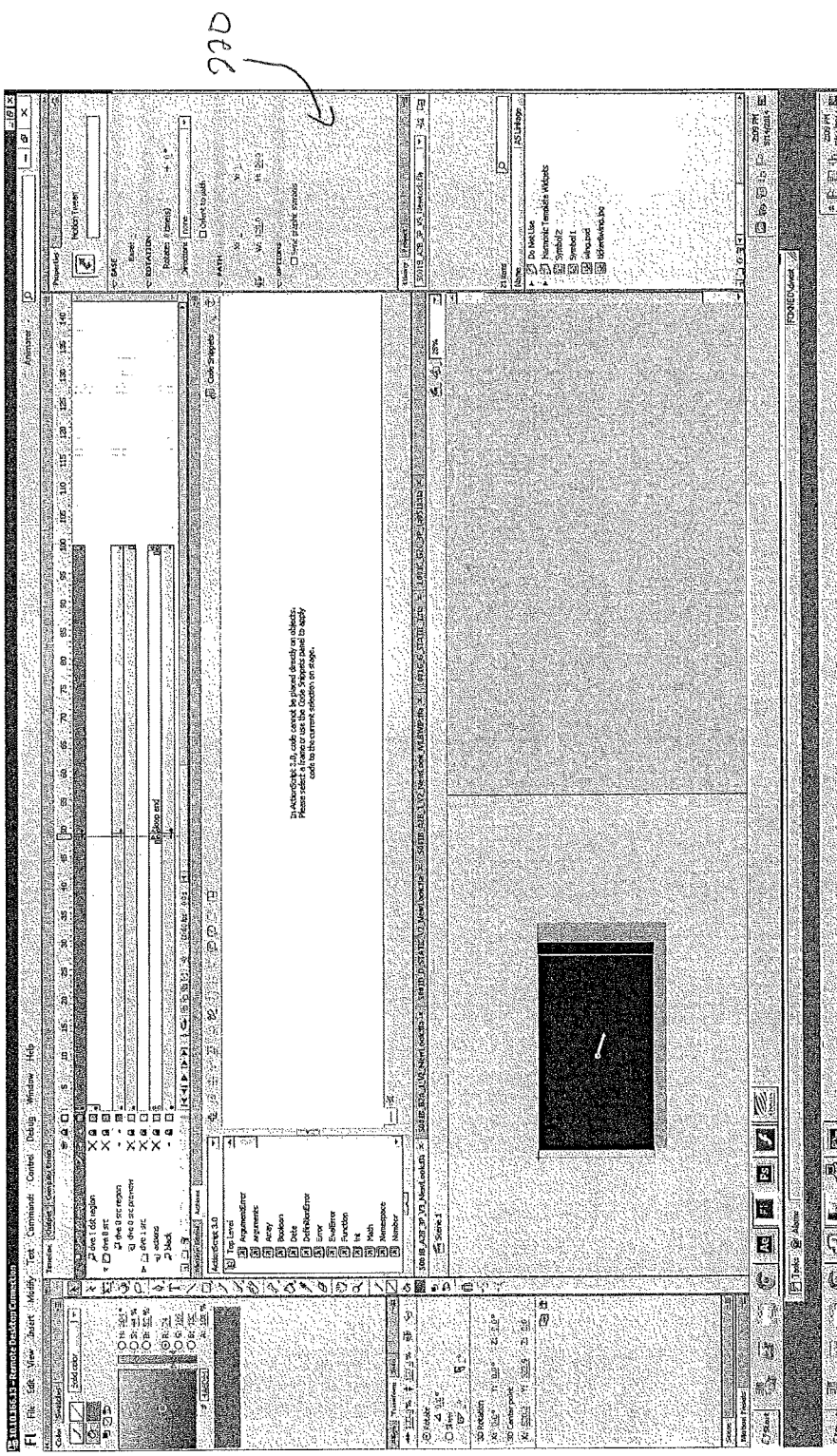
FIG. 27 illustrates an exemplary page for creation of effects in Adobe Flash.
Figure 28:
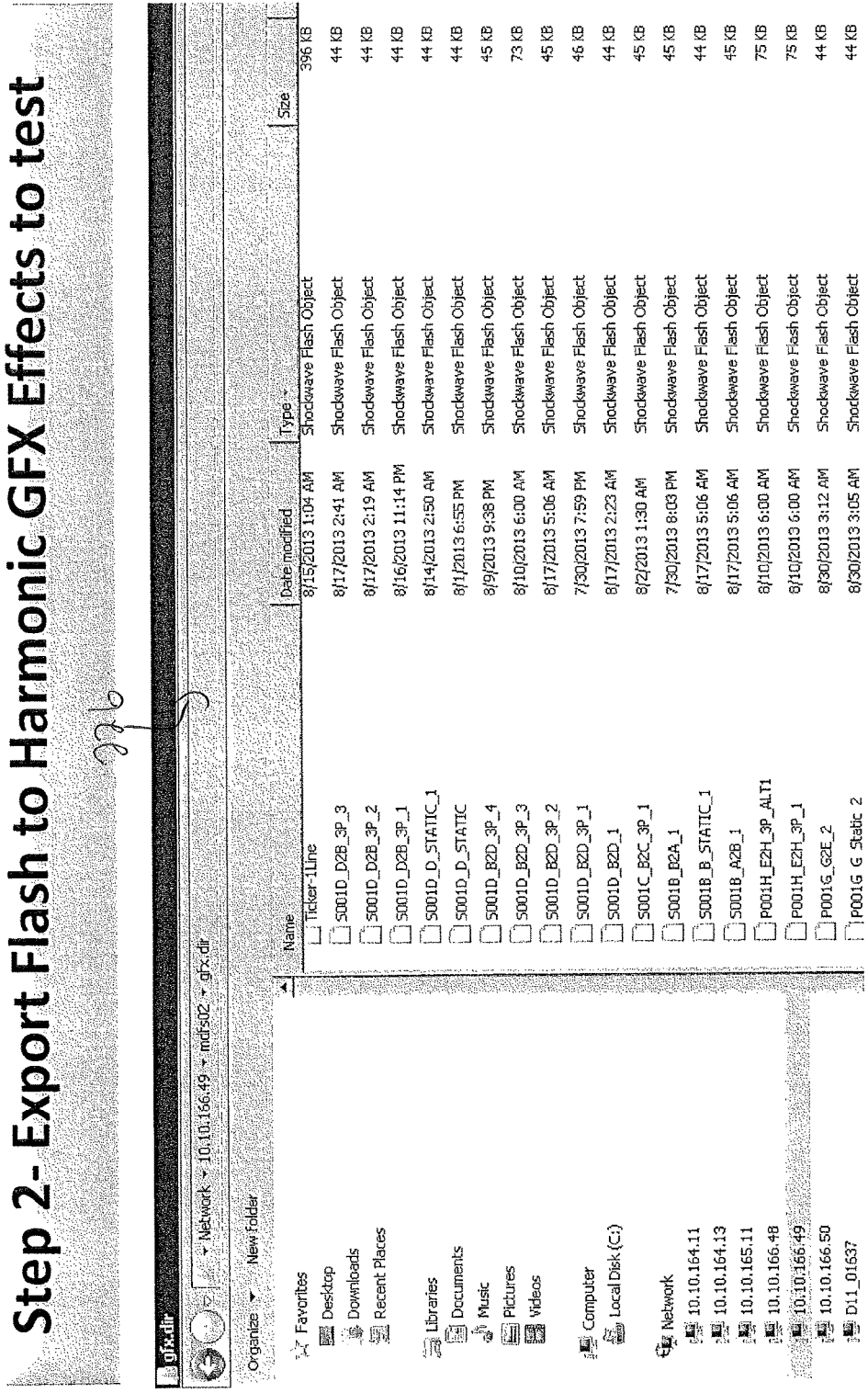
FIG. 28 illustrates an exemplary Flash export page.
Figure 44:
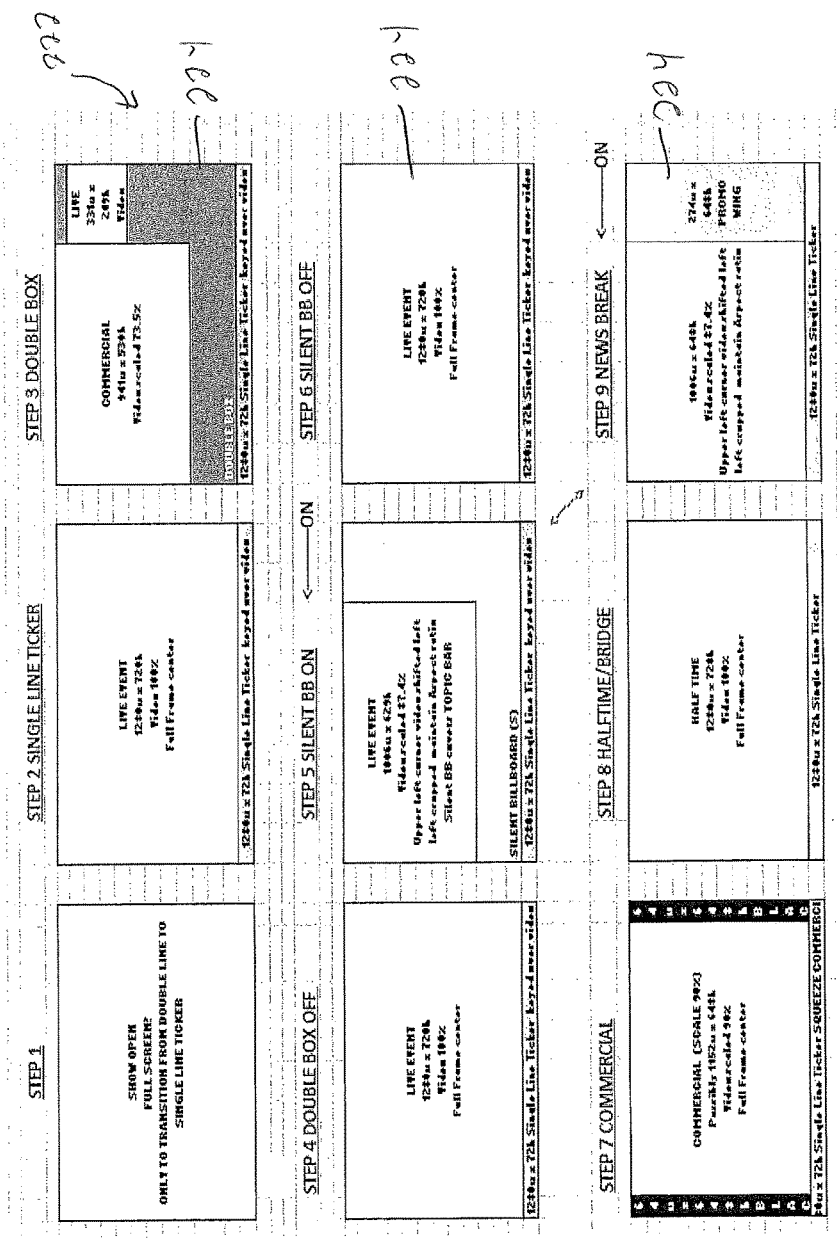
FIG. 44 illustrates an exemplary style guide.

A first exemplary step is creation of an effect in a program, e.g., Adobe Flash, where keyframes are edited to create effects, as in 220 in FIG. 27. A style guide 222 with different styles 224 may be used as in FIG. 44. The Flash (or other program format, though from here on, we will describe Flash as an example) may then be exported to e.g., Harmonic GFX Effects for testing, as at 226 in FIG. 28. An exemplary description of the Harmonic GFX EFX is illustrated at 228 in FIG. 29.

Subsequently in exemplary embodiments, the file, e.g., .swf and GFX may be used to create a Snell MediaBall EFX (creating a subset of instructions sent to Harmonic to Re-create the desired effects, which may be made available system wide), as at 230 in FIG. 30. An exemplary description of the Harmonic GFX EFX and corresponding Snell MediaBalls is illustrated at 232 in FIG. 31. In exemplary embodiments, the appropriate Snell MediaBall EFX may be added (translated from traffic to automation using the Snell translator and/or by manually selection to be added to the list) as in 234 in FIG. 32.

In exemplary embodiments, the effect may be run (nested Snell Mediaball "instructions" can be expanded to show steps), as at 236 in FIG. 33. FIG. 34 shows another screen at 238 for running the effect ("instructions" showing the selected graphical elements can be edited on the right side of the screen in FIG. 34, if necessary.

Figure 35:
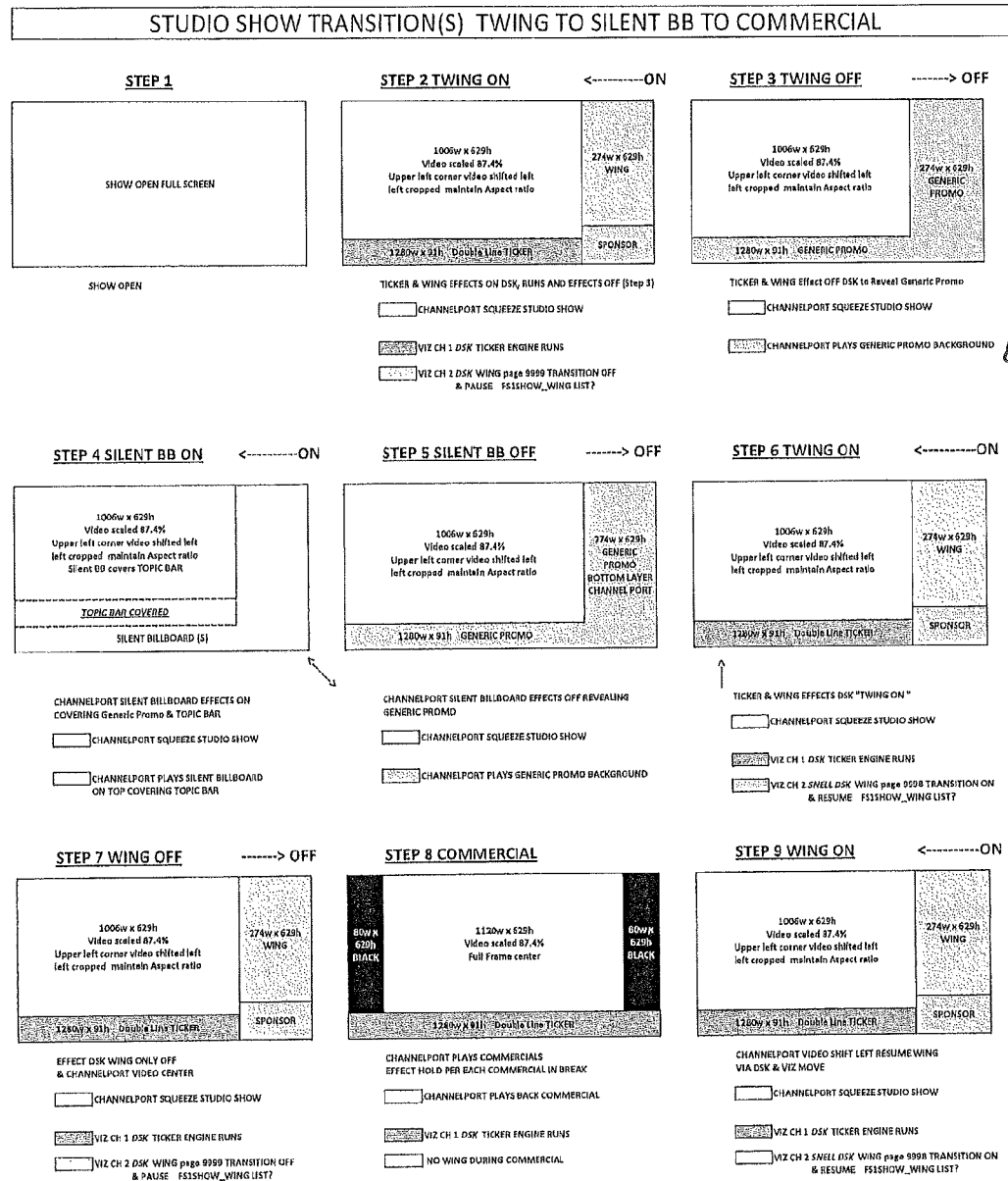
FIG. 35 illustrates an exemplary flowchart for transitions from TWING to commercials.
Figure 36:
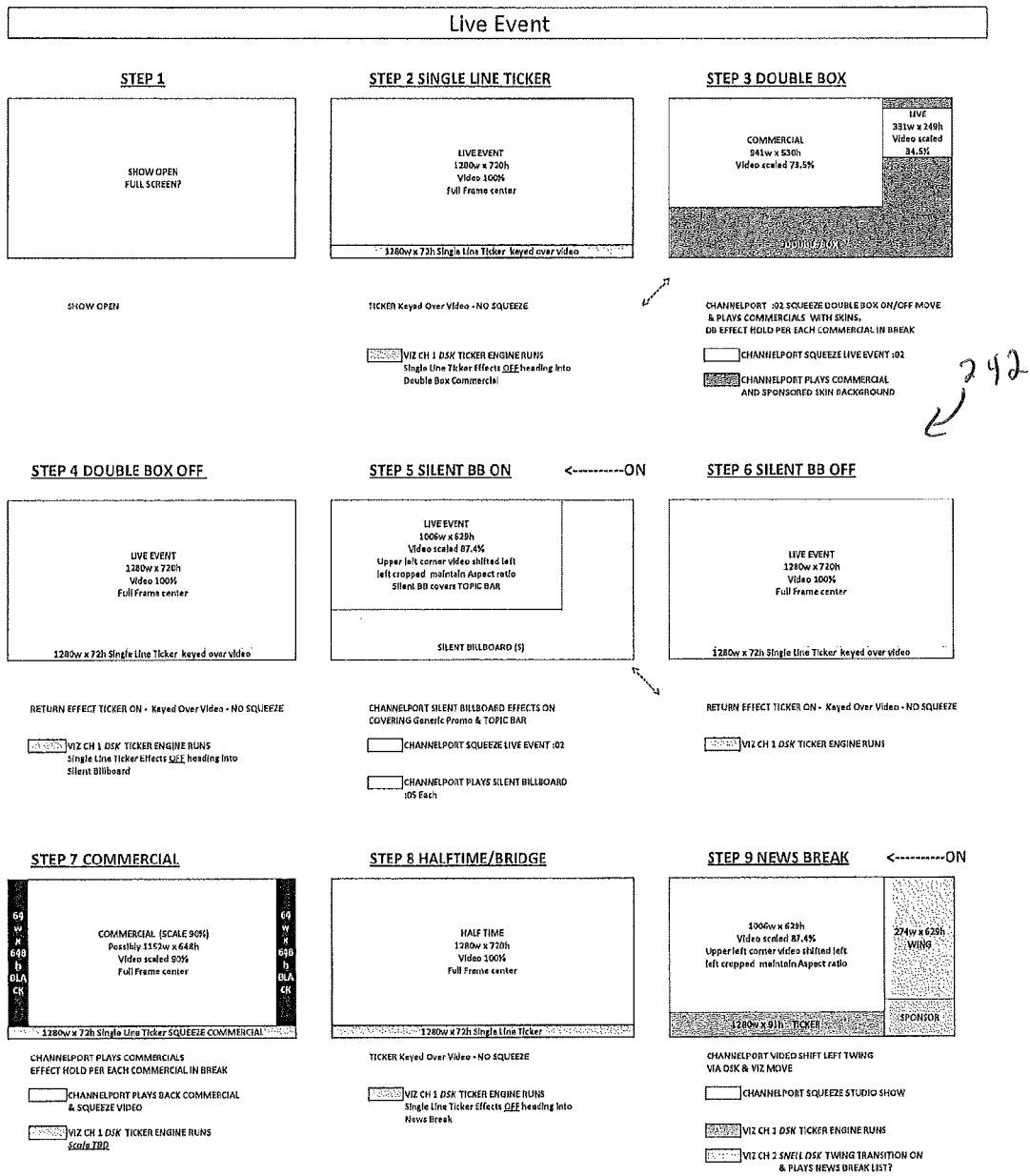
FIG. 36 illustrates an exemplary flowchart for transitions from Live Event to commercials.
Figure 37:
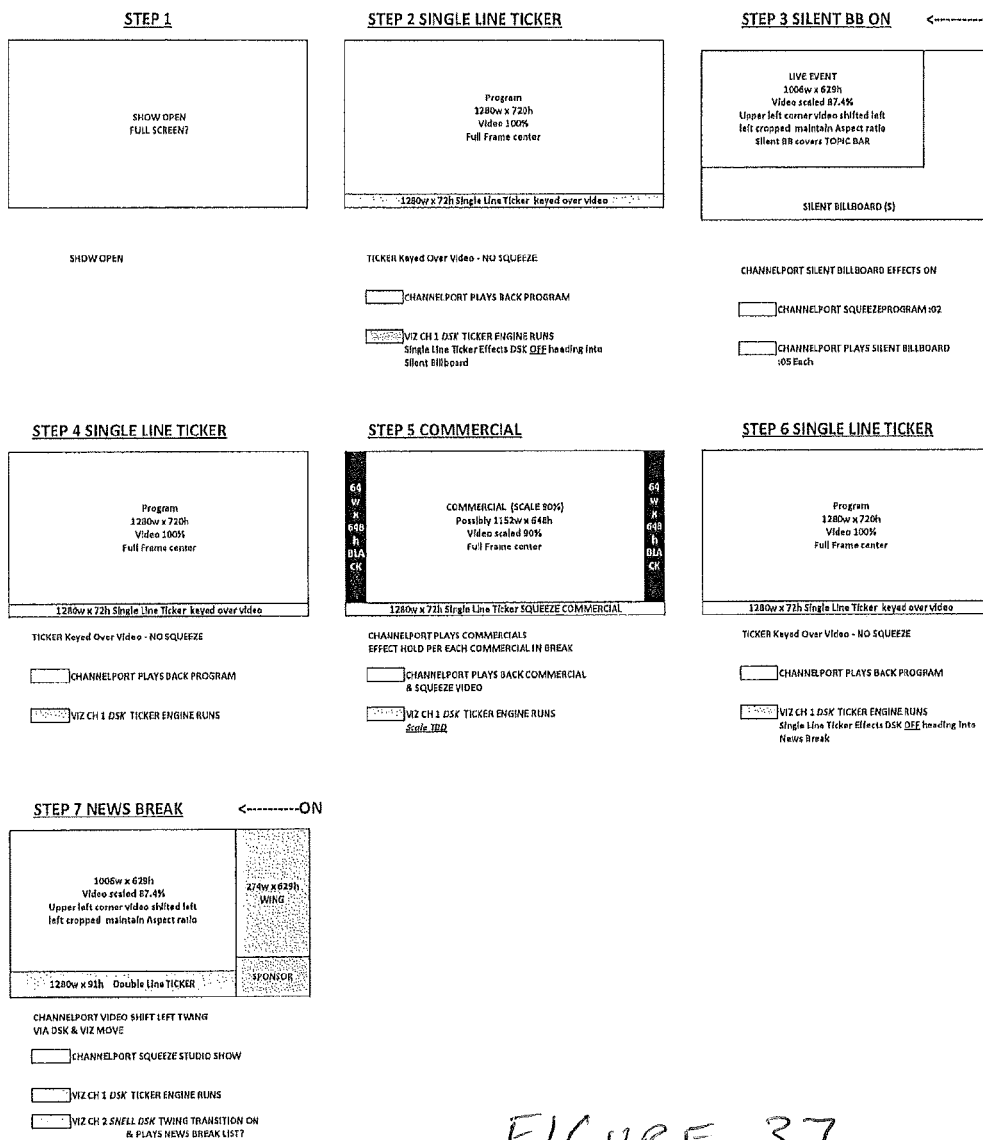
FIG. 37 illustrates an exemplary flowchart for transitions from other programming to commercials.
Figure 38:
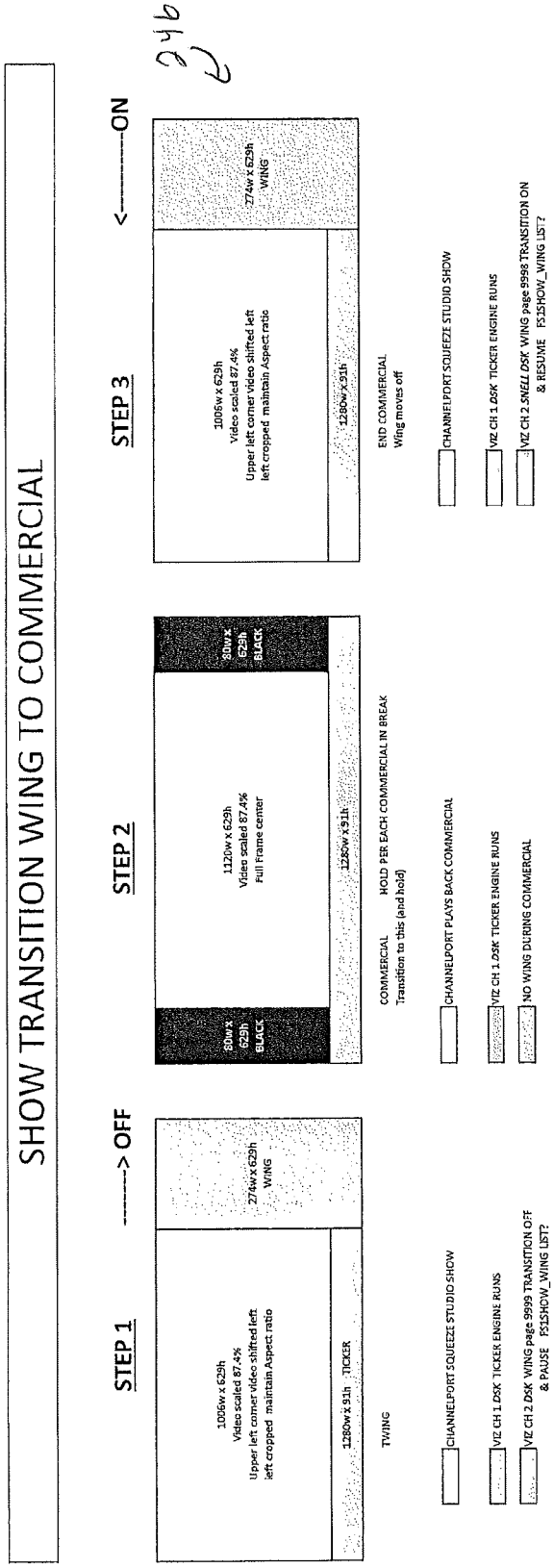
FIG. 38 illustrates an exemplary flowchart for transitions from WING to commercials.

FIG. 35 shows a transition from TWING to SILENT BB to Commercial at 240. FIG. 36 shows a Live Event transition to SILENT BB to Commercial at 242. FIG. 37 shows other programming transitions to SILENT BB to Commercial at 244. FIG. 38 shows a transition from WING to Commercial at 246.

Figure 39:
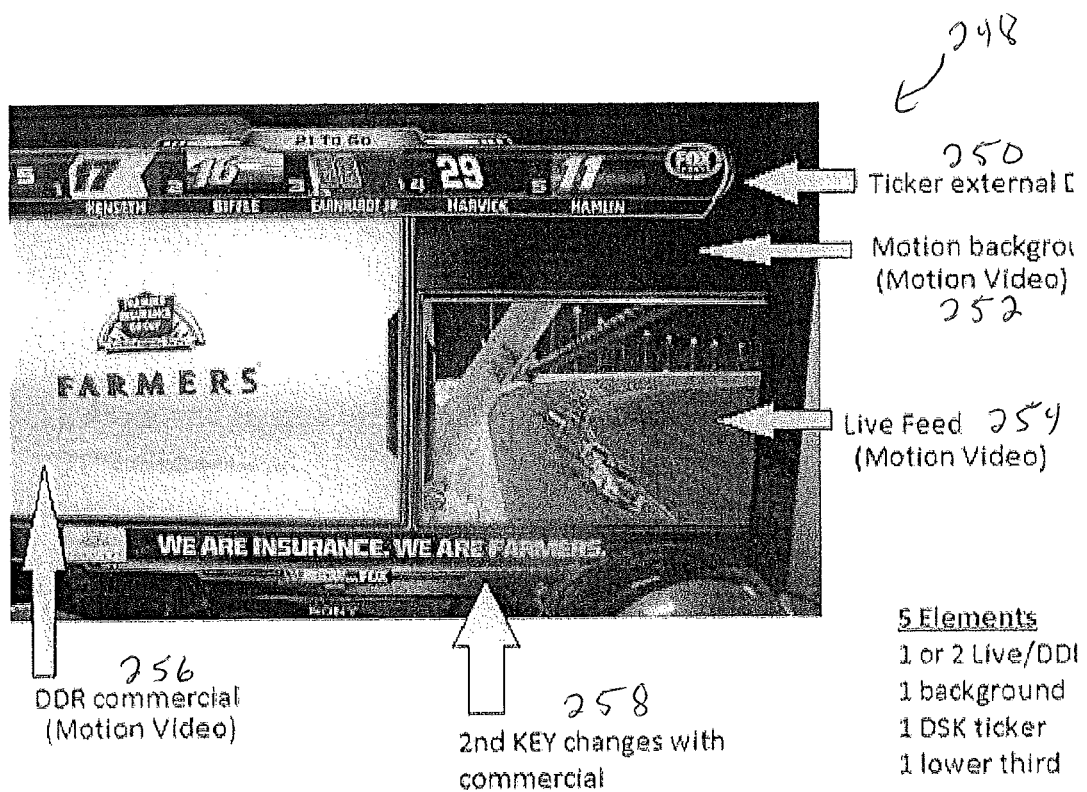
FIG. 39 illustrates an exemplary production screen incorporating various discrete component aspects.
Figure 46:
Figure 41:
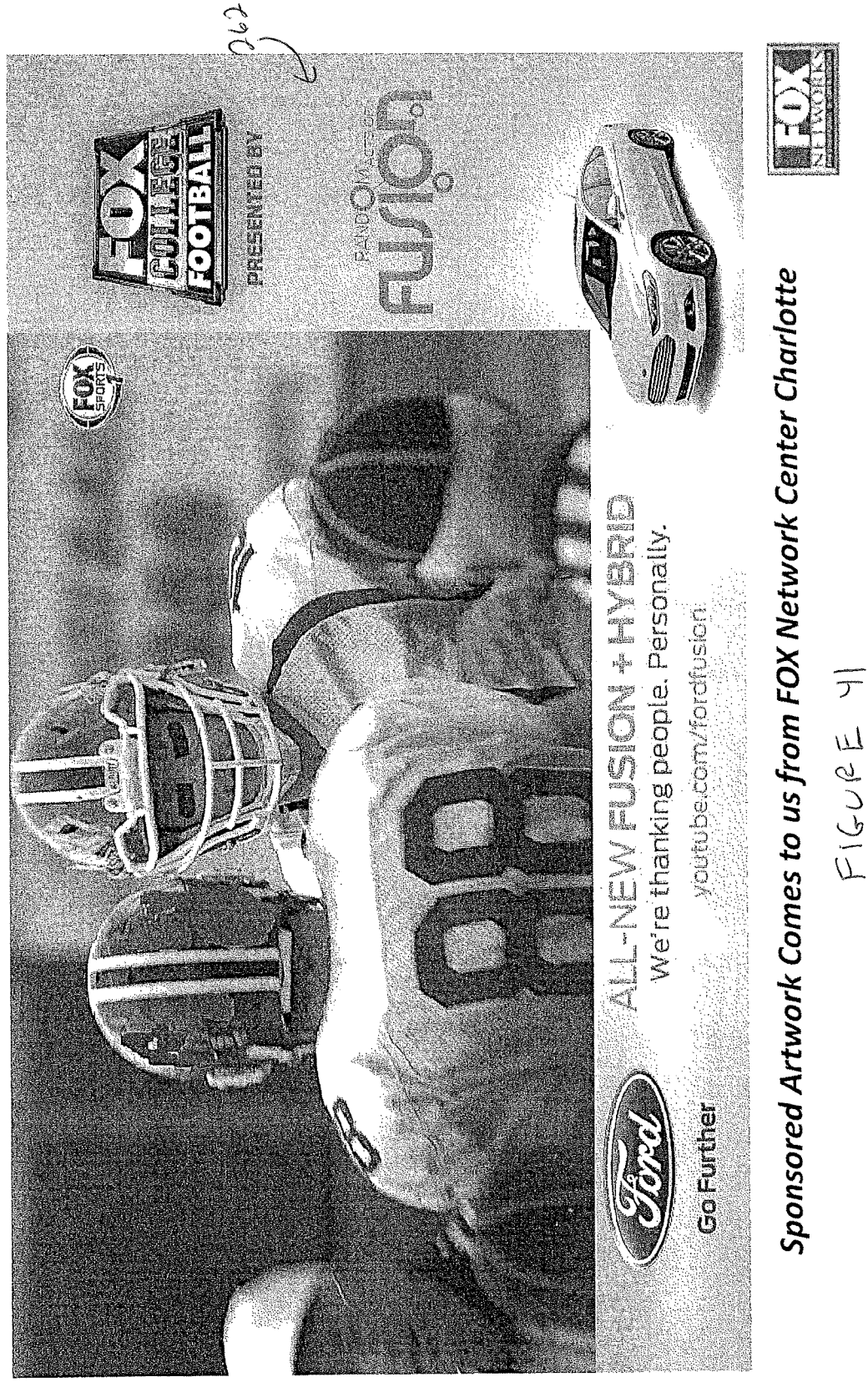
FIG. 41 illustrates an exemplary production screen incorporating Master Control flow L Billboard effects.

FIG. 39 illustrates an exemplary production display 248 with external ticker 250, motion background (motion video) 252, live feed (motion video) 254, DDR commercial (motion video) 256 and $2^{nd}$ KEY changes with commercial 258. FIG. 40 illustrates an exemplary production display with a master control flow TWING effect at 260. FIG. 41 illustrates an exemplary production display with a master control flow L Billboard effect at 262 FIG. 42 illustrates an exemplary production display with a master control flow double box effect at 264.

Figure 43:
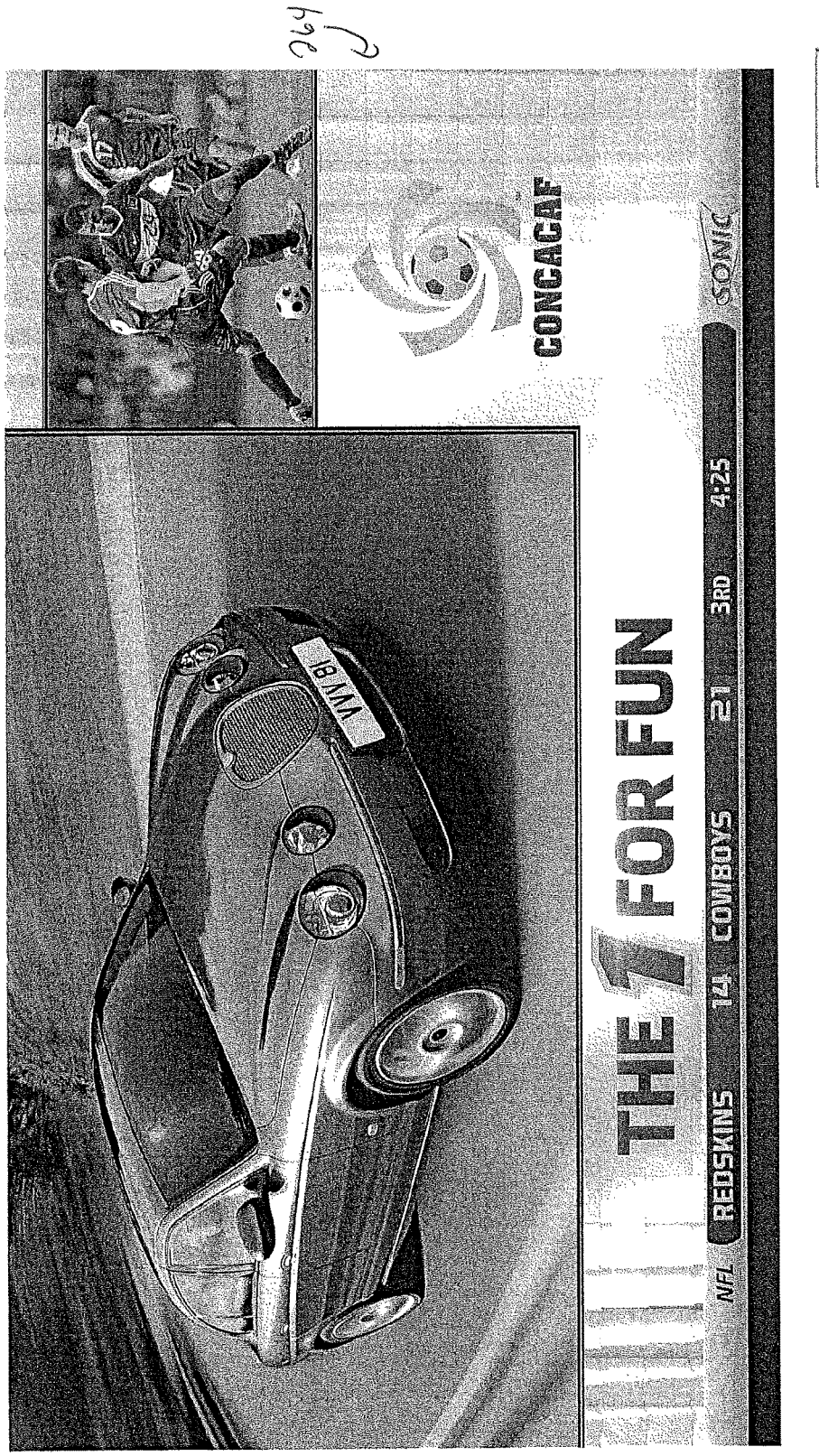
FIG. 43 illustrates an exemplary master control interface.
Figure 43:
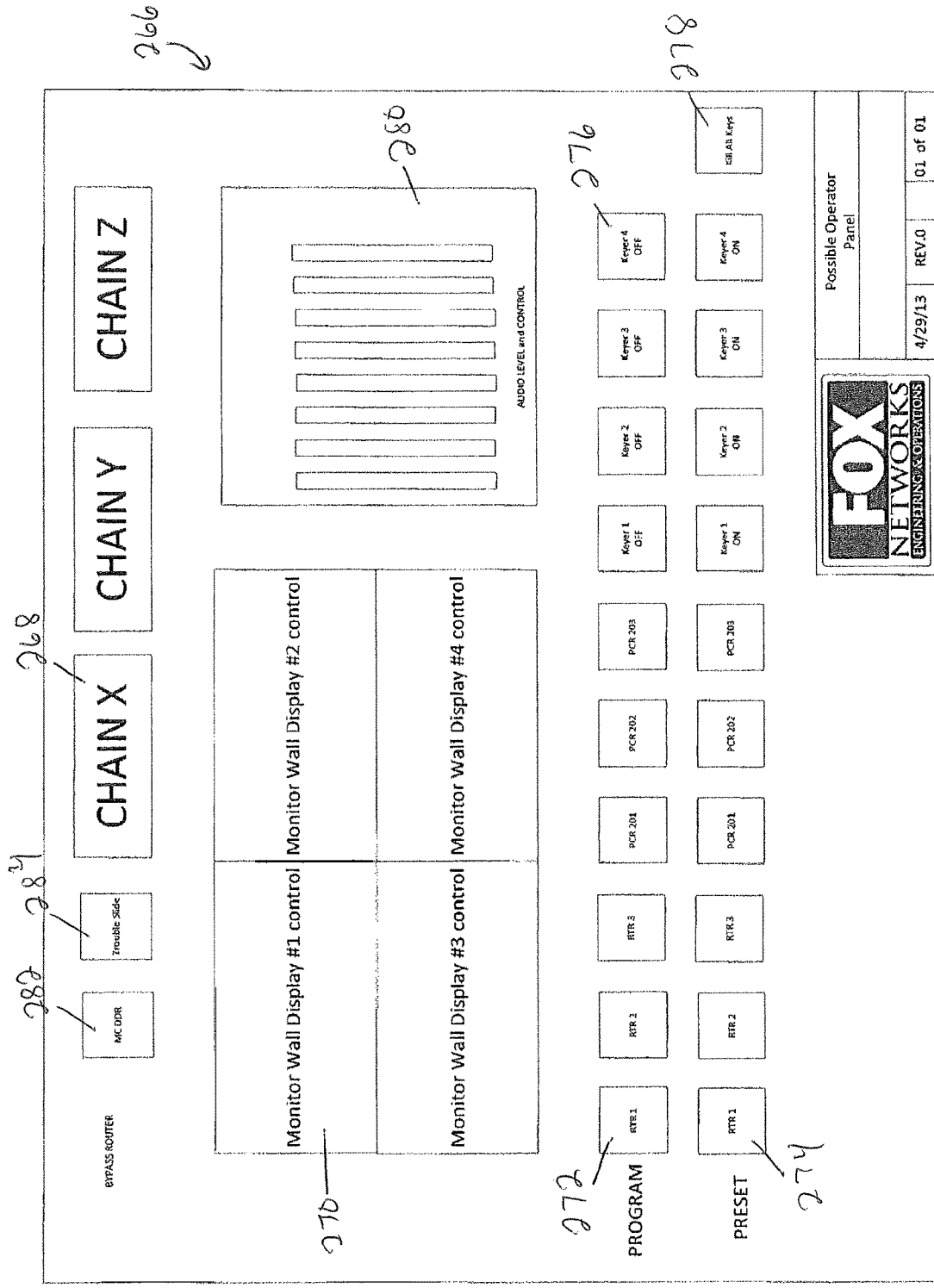

FIG. 43 illustrates an exemplary master control interface (described herein as "operator interface" or "operator panel") 266, with controls for chain selection (Chain X, Chain Y, etc.) 268, monitor wall display controls 270, program controls (RTR1, RTR 2, etc.) 272, Preset controls (RTR1, RTR2, etc.) 274, Keyer on and off controls 276, kill all keys controls 278, audio level and control 280, MC DDR control 282 and Trouble Slide control 284.

The above also translates to improved advertising methods, including control and integration of advertising campaigns across different content streams or networks.

Further, additional data elements, e.g., statistics, multiple box displays and angles or other related or non-related (i.e., different streams or content) may be managed by the control, allowing for complete customization from a central location. Further, such a system may allow for automatic data integration depending upon content selection (e.g., updated scores).

Reference is made and incorporated herein with regard to the attached.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be further understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components and/or groups, but do not preclude the presence or addition of one or more other features, integers, steps, operations, elements, components, and/or groups thereof.

It will also be understood that the terms "photo," "photograph," "image," "screen shot" or any variation thereof may be interchangeable. Thus, any form of graphical image may be applicable to example embodiments.

It will also be understood that the terms "statistics," "measurements," "analytics," "calculations," or other similar terms may be used to describe example forms of the associated definitions as understood by one of ordinary skill in the art, although other similar acts/functions may be applicable depending upon any particular form of an example embodiment. For example, a statistical calculation may include analytical calculations, and vice versa. Furthermore, measurements may include calculations upon, during, subsequent, or in addition to measurements or any act of retrieving data.

It should also be understood that other terms used herein may be applicable based upon any associated definition as understood by one of ordinary skill in the art, although other meanings may be applicable depending upon the particular context in which terms are used.

Therefore, the terminology used herein is for the purpose of describing particular embodiments only and is not intended to be limiting of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Further to the brief description provided above and associated textual detail of each of the figures, the following description provides additional details of example embodiments of the present invention.

It is further noted that exemplary embodiments may be embodied in the form of computer-implemented processes and apparatuses for practicing those processes. Therefore, according to an exemplary embodiment, the methodologies described hereinbefore may be implemented by a computer system or apparatus. Portions or the entirety of the methodologies described herein may be executed as instructions in a processor of the computer system. The computer system includes memory for storage of instructions and information, input device(s) for computer communication, and display device. Thus, the present invention may be implemented, in software, for example, as any suitable computer program on a computer system somewhat similar to computer system. For example, a program in accordance with the present invention may be a computer program product causing a computer to execute the exemplary methods described herein.

Therefore, embodiments can be embodied in the form of computer-implemented processes and apparatuses for practicing those processes on a computer program product. Embodiments include the computer program product as depicted in on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be emphasized that the above-described example embodiments, including the best mode, and any detailed discussion of particular examples, are merely possible examples of implementations of example embodiments, and are set forth for a clear understanding of the principles of the invention. Many variations and modifications may be made to the above-described embodiment(s) of the invention without departing from the spirit and scope of the invention. All such modifications and variations are intended to be included herein within the scope of this disclosure and the present invention and protected by the following claims.

What is claimed is:

1. A system for managing plural content shows or streams across at least one network for a broadcast production, comprising:
   plural master control rooms configured with hardware elements to which productions or master control signal chains can be recalled, said hardware elements including an MCR control panel including a graphical user interface;
   a router control system configured to dynamically assign said plural master control rooms to productions or production settings; and
   a VSM virtual control layer configured to recall any channel or operation to said MCR control panel of any master control room with a manual button push or a pre-scheduled recall, wherein said hardware elements in each master control room acts as shells to which productions or master control signal chains can be recalled, wherein graphical user interfaces are presented with panel layouts according to the type of recalled production, and further wherein the VSM virtual control layer uses logic for requests that take into account any on-air Tally status so that no on air studio can be changed at any time to another production accidentally.

2. A system in accordance with claim 1, wherein said graphical user interface is configured to display the availability of said plural master control rooms for assignment to said productions or production settings.

3. A system in accordance with claim 2, wherein said graphical user interface interface comprises at least one touchscreen display configured to display said plural master control rooms and to allow assignment and reassignment of productions or production settings to said plural master control rooms.

4. A system in accordance with claim 3, wherein said graphical user interface is configured to provide controls for real time, dynamic moving of productions or production settings to a desired control room.

5. A system in accordance with claim 1, wherein said graphical user interface is configured with administrator controls to confirm or deny control room production requests.

6. A system in accordance with claim 1, wherein said graphical user interface is configured to display and provide controls for on-air status, panel navigation status and production type.

7. A system in accordance with claim 1, wherein said graphical user interface is configured to display and provide controls for routing and net chain status.

8. A system in accordance with claim 1, wherein said graphical user interface is configured as an integrated control for panel navigation and status, routing and net chain status and mixer control.

9. A system in accordance with claim 8, wherein said graphical user interface is configured with a multiviewer routing and setup page.

10. A system in accordance with claim 8, wherein said graphical user interface is configured with at least one administrator status or setup panel.

11. A system in accordance with claim 8, wherein said graphical user interface is configured with a control room status and assignment page.

12. A system in accordance with claim 8, wherein said graphical user interface is configured with a control room production scheduling page.

13. A system in accordance with claim 8, wherein said graphical user interface is configured with an emergency production switching page for said plural control rooms.

14. A system in accordance with claim 8, wherein said graphical user interface is configured with an offline production preparation and storage page.

15. A system in accordance with claim 8, wherein said graphical user interface is configured with at least one preset management, overview or assignment page.

16. A system in accordance with claim 1, wherein automated broadcast content is provided for inclusion in said production.

17. A system in accordance with claim 16, wherein Snell automation is used to switch channel live inputs, drive commercial playback, control and send commands to inserting wing and ticker.

18. A method of managing plural content shows or streams across at least one network for a broadcast production, comprising:
   configuring plural master control rooms with hardware elements to which productions or master control signal chains can be recalled, said hardware elements including an MCR control panel including a graphical user interface;
   routing, via a control system configured to dynamically assign said plural master control rooms to productions or production settings; and
   recalling via a VSM virtual control layer any channel or operation to said MCR control panel of any master control room with a manual button push or a pre-scheduled recall, wherein said hardware elements in each master control room acts as shells to which productions or master control signal chains can be recalled, wherein graphical user interfaces are presented with panel layouts according to the type of recalled production, and further wherein the VSM virtual control layer uses logic for requests that take into account any on-air Tally status so that no on air studio can be changed at any time to another production accidentally.

19. A method in accordance with claim 18, further comprising displaying via said graphical user interface the availability of said plural master control rooms for assignment to said productions or production settings.

20. A method in accordance with claim 19, further comprising configuring at least one touchscreen display to display said plural master control rooms and to allow assignment and reassignment of productions or production settings to said plural master control rooms.

21. A method in accordance with claim 20, further comprising real time, dynamic moving of productions to a desired master control room.

22. A method in accordance with claim 18, wherein said graphical user interface is configured with administrator controls to confirm or deny master control room production requests.

23. A method in accordance with claim 18, wherein said graphical user interface is configured to display and provide controls for on-air status, panel navigation status and production type.

24. A method in accordance with claim 18, wherein said graphical user interface is configured to display and provide controls for routing and net chain status.

25. A method in accordance with claim 18, wherein said graphical user interface is configured as an integrated control for panel navigation and status, routing and net chain status and mixer control.

26. A method in accordance with claim 25, wherein said graphical user interface is configured with a multiviewer routing and setup page.

27. A method in accordance with claim 25, wherein said graphical user interface is configured with at least one administrator status or setup panel.

28. A method in accordance with claim 25, wherein said graphical user interface is configured with a master control room status and assignment page.

29. A method in accordance with claim 25, wherein said graphical user interface is configured with a master control room production scheduling page.

30. A method in accordance with claim 25, wherein said graphical user interface is configured with an emergency production switching page for said plural control rooms.

31. A method in accordance with claim 25, wherein said graphical user interface is configured with an offline production preparation and storage page.

32. A method in accordance with claim 25, wherein said graphical user interface is configured with at least one preset management, overview or assignment page.

33. A method in accordance with claim 18, wherein automated broadcast content is provided in said production.

34. A system in accordance with claim 33, wherein Snell automation is used to switch channel live inputs, drive commercial playback, control and send commands to inserting wing and ticker.

\* \* \* \* \*